United States Patent
Ohara et al.

(10) Patent No.: US 6,763,174 B2
(45) Date of Patent: *Jul. 13, 2004

(54) IMAGE RECORDING AND REPRODUCING APPARATUS

(75) Inventors: Yasunori Ohara, Hitachinaka (JP); Akira Saitou, Ibaraki-ken (JP); Takeo Ohkouchi, Ibaraki-ken (JP); Hiroo Okamoto, Yokohama (JP); Nobutaka Amada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 09/904,554

(22) Filed: Jul. 16, 2001

(65) Prior Publication Data

US 2001/0038741 A1 Nov. 8, 2001

Related U.S. Application Data

(63) Continuation of application No. 09/037,124, filed on Mar. 9, 1998, now Pat. No. 6,292,618.

(30) Foreign Application Priority Data

Mar. 11, 1997 (JP) .......................................... 09-055869
Mar. 21, 1997 (JP) .......................................... 09-067715

(51) Int. Cl.[7] ............................. H04N 5/91; H04N 7/26
(52) U.S. Cl. ........................ 386/46; 386/124; 386/109
(58) Field of Search .......................... 386/46, 83, 109, 386/111, 112, 27, 33, 1, 4, 52, 38, 107, 117, 124, 40; H04N 5/91, 7/26

(56) References Cited

U.S. PATENT DOCUMENTS

| | | | | |
|---|---|---|---|---|
| 5,016,107 A | * | 5/1991 | Sasson et al. | |
| 5,027,214 A | * | 6/1991 | Fukimori | 386/117 |
| 5,032,927 A | * | 7/1991 | Watanabe et al. | 386/117 |
| 5,377,051 A | * | 12/1994 | Lane et al. | |
| 5,541,738 A | * | 7/1996 | Mankovitz | |
| 5,576,758 A | * | 11/1996 | Arai et al. | |
| 5,666,159 A | * | 9/1997 | Parulski et al. | 386/117 |
| 6,292,618 B1 | * | 9/2001 | Ohara et al. | 386/46 |

OTHER PUBLICATIONS

"5. Broadcasting Service Image," J. Inst. TV Engrs. of JP, 47:4, 1993, pp. 486–503.
Nikkei Electronics, No. 634, pp. 16 and 17.

* cited by examiner

*Primary Examiner*—Robert Chevalier
(74) *Attorney, Agent, or Firm*—Antonelli, Terry, Stout & Kraus, LLP

(57) ABSTRACT

An image recording and reproducing apparatus can record and reproduce both a digital signal and an analog signal. Operations of a broadcast receiving apparatus and a recording and reproducing apparatus are integrated, and superimposition of information on an analog image is realized during recording and reproduction of a digital signal. The broadcast receiving apparatus and the recording and reproducing apparatus communicate with each other to be able to set and obtain states of the opposite apparatus, so that one of the apparatus notifies information of the other apparatus to a user, and causes the user to set the information in a picture having the same form as a picture used to notify a state of one apparatus to the user, and causes the user to set the state.

12 Claims, 22 Drawing Sheets

FIG. 20

| | CHANGE-OVER SWITCH | | | SIGNALS FROM REFERENCE SIGNAL PRODUCING CIRCUIT 30 |
|---|---|---|---|---|
| | 5 | 23 | 24 | |
| ANALOG RECORDING | A | R | N | Hsync / 2 |
| ANALOG REPRODUCTION | | P | R | INTERNALLY PRODUCED SIGNAL OF 29.97 Hz |
| DIGITAL RECORDING AND REPRODUCTION — DURING SUPER-IMPOSITION OF CHARACTERS | D | R | R | INTERNALLY PRODUCED SIGNAL OF 30.00 Hz |
| DIGITAL RECORDING AND REPRODUCTION — NON-SUPER-IMPOSITION OF CHARACTERS | D | R | N | SREF/2 |

IMAGE RECORDING AND REPRODUCING APPARATUS

CROSS-REFERENCE TO RELATED APPLICATION

This application is a continuation of Ser. No. 09/037,124 filed Mar. 9, 1998, now U.S. Pat. No. 6,292,618.

BACKGROUND OF THE INVENTION

The present invention relates to an image recording and reproducing apparatus capable of recording and reproducing both of digital signals and analog signals and more particularly to a reference signal necessary to display a state of the image recording and reproducing apparatus in a picture and an operation method of the image recording and reproducing apparatus.

As a domestic apparatus for recording and reproducing image and audio signals, an analog type video tape recorder (hereinafter abbreviated to as VTR) using a magnetic tape is now put to practical use.

On the other hand, a digital television broadcasting begins to be put to practical use as a television broadcasting for the next generation. For example, there is known a system in which the MPEG (Moving Picture Experts Group) system is used to code analog image and audio signals by the high-efficient digital compression code and the coded signals are broadcasted by means of a satellite and coaxial cables. Further, an intelligent receiver and decoder (hereinafter abbreviated to as IRD) which receives digital satellite broadcast and produces analog image and audio signals also begins to be put to practical use.

The above digital broadcasting systems are described in detail in, for example, the Journal of the Institute of Television Engineers of Japan, Vol. 47, No. 4 (1993), pp. 486–503, "5. Broadcasting Service Image".

Furthermore, a VTR which can record and reproduce the digital-compression coded image and audio signals in the digital television broadcasting or the like as the signals are digital and possesses the interchangeability with a current analog VTR is being developed.

Such a VTR which can record and reproduce both of the digital signals and the analog image and audio signals is considered to be configured as shown in, for example, Nikkei Electronics, No. 634, pp. 16–17.

It is not considered that a conventional VTR records such digital broadcast. It is premised that the conventional VTR records image and audio signals supplied by a built-in tuner for receiving analog broadcast. When digital broadcast is recorded, image and audio signals produced by the IRD are inputted from an external input terminals of the VTR to be recorded.

However, the VTR and the IRD are quite independent of each other. For example, in order to preengage to record a program of digital broadcast, it is necessary to set the preengagement in both of the IRD and the VTR. The operation methods of both the apparatuses must be memorized exactly.

Further, many VTRs being currently put on the market includes an on-screen display circuit (hereinafter referred to as OSD circuit) for superimposing information on an analog image signal and an operation state or the like of the VTR can be reported to a user through a picture of a monitoring television (hereinafter abbreviated to as TV). At this time, in order to superimpose information on the analog image, it is necessary to supply a complex synchronization signal which is a reference of the analog image signal to the OSD circuit.

On the other hand, a reference signal inputted to a servo circuit is a complex synchronization signal which is a synchronization signal for an analog image in the case of recording and reproducing of analog signals while the reference signal is a digital synchronization signal outputted by a digital signal processing circuit in the case of recording and reproducing of digital signals. The signal inputted to the servo circuit is different depending on the recording and reproducing times of analog signals and digital signals.

In addition, in the conventional VTR, the servo circuit and the OSD circuit are configured to be supplied with the same reference signal and it is impossible to superimpose information on the image signal upon recording and reproducing of digital signals.

SUMMARY OF THE INVENTION

It is a primary object of the present invention to provide means for unifying operation methods of the VTR and the IRD in order to solve the above problem.

It is another object of the present invention to make it possible to superimpose an analog image signal even during recording and reproduction operation of digital signals.

In order to achieve the above objects, the VTR and the IRD communicate with each other so that the VTR and the IRD can set and obtain the operation states and the set contents of the other apparatus and the IRD notifies information of the VTR to the user by using the picture of the same form as the picture in which the state of the IRD is notified to the user and causes the user to set the state of the VTR by using the picture of the same form as the picture in which the IRD causes the user to set the state of the IRD. Further, similarly, the VTR notifies information of the IRD to the user by using the picture of the same form as the picture in which the state of the VTR is notified to the user and causes the user to set the state of the IRD by using the picture of the same form as the picture in which the VTR causes the user to set the state of the VTR. In this manner, operations of the VTR and the IRD are integrated and the user's operation is simplified.

Further, a signal having the phase coincident with a reference signal for a digital signal is produced in a servo circuit before information is superimposed on an analog image and a reference signal for an analog image signal is supplied to the OSD circuit while information is superimposed. At the same time, a reference signal used in the servo circuit is changed to the internally produced reference signal, so that information can be superimposed on the analog image signal while the rotation phases of the drum and the capstan are locked.

BRIEF DESCRIPTION OF THE DRAWINGS

Preferred embodiments of the present invention and prior arts will now be described in conjunction with the accompanying drawings, in which:

FIG. 20 is a diagram showing a phase reference signal produced by a phase reference signal producing circuit in accordance with modes of the VTR;

DESCRIPTION OF THE PREFERRED EMBODIMENTS

Figure 1:
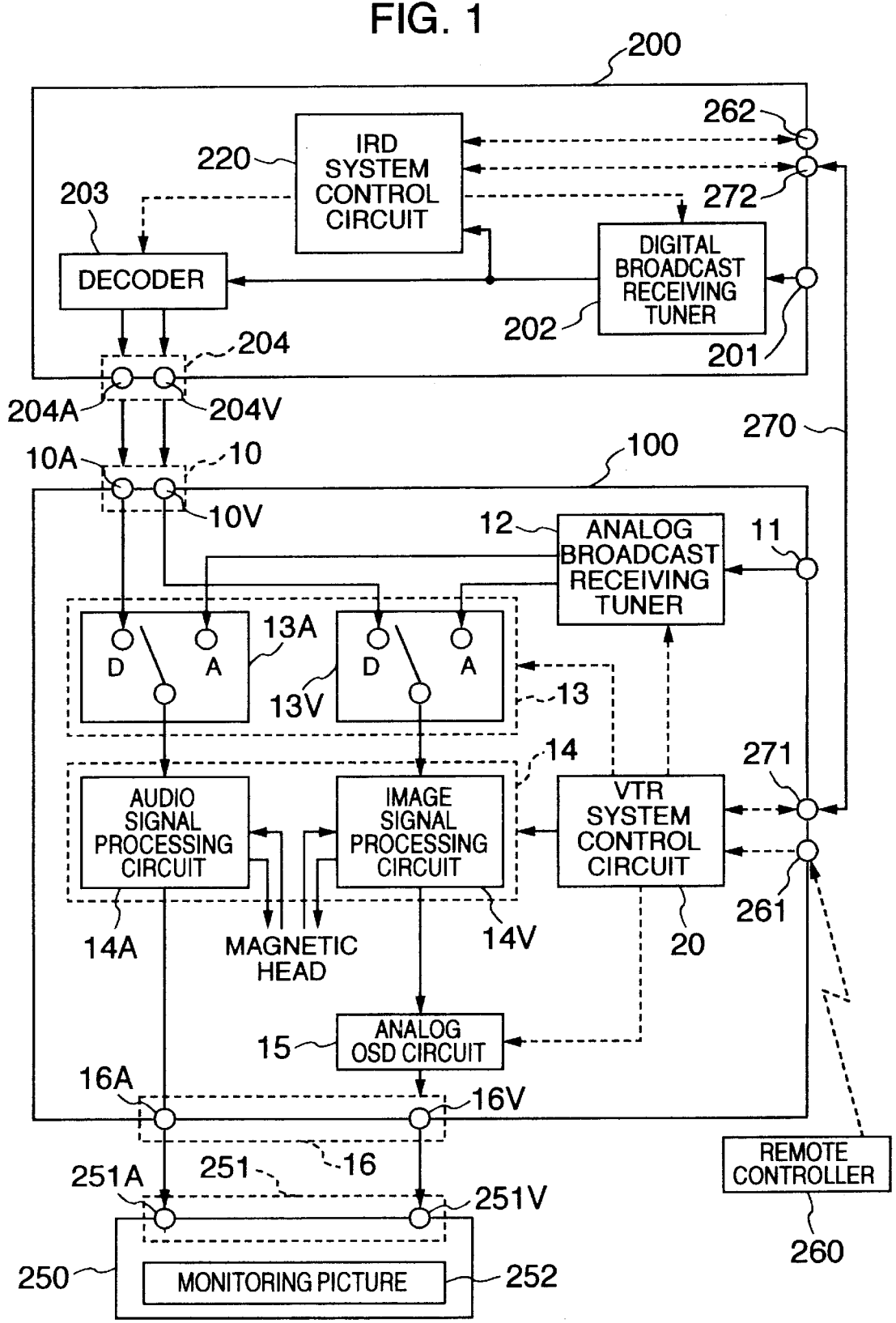
FIG. 1 is a block diagram schematically illustrating a first embodiment of an image recording and reproducing apparatus according to the present invention.

FIG. 1 is a circuit diagram schematically illustrating a first embodiment of an image recording and reproducing apparatus according to the present invention. The apparatus magnetically records and reproduces analog image and voice on a half-inch tape of oxide by way of example.

In FIG. 1, numeral 100 denotes a video tape recorder (hereinafter abbreviated to as VTR), 200 an intelligent receiver and decoder (hereinafter abbreviated to as IRD), and 250 a monitoring television (hereinafter abbreviated to as TV). Further, arrowheaded single line represents a flow of image and audio signals and broken line represents a flow of control.

First, constituent elements of the VTR 100 are described.

Numeral 10 denotes external input terminals to which image and audio signals for digital broadcast supplied from the IRD 200 are premised to be inputted, 11 an input terminal for inputting an analog broadcast signal, 12 an analog broadcast receiving tuner for receiving the analog broadcast signal to be demodulated, 13 input change-over switches for changing over input sources, 13V an image input change-over switch for changing over an image signal, 13A an audio input change-over switch for changing over an audio signal, 14 a signal processing circuit for image and voice, 14V an image signal processing circuit for processing an image signal, 14A an audio signal processing circuit for processing an audio signal and which operates so that a recorded signal is supplied to a magnetic head to be recorded upon recording and a signal reproduced by the magnetic head is reproduced to be outputted upon reproduction, and 15 an analog on-screen display circuit (hereinafter referred to as analog OSD circuit) for superimposing information on the background of an inputted image signal or an internally produced image signal. Display of information on the background of the inputted image signal is named superimposition display and display of information on the background of the internally produced blue or green image signal is named blue-back display. These terms are used hereinafter. In the embodiment, the analog OSD circuit 15 is used to display operation states of the VTR 100 and the IRD 200 in the superimposition display manner. Numeral 16 denotes output terminals for outputting image and audio signals from the VTR 100, 20 a VTR system control circuit for controlling the whole operation of the VTR 100 by controlling all of the constituent elements of the VTR 100, 260 a remote controller including buttons for operating the VTR 100 and the IRD 200, 261 a receiving portion for receiving a user's operation request from the remote controller to transmit the request to the VTR system control circuit 20.

Figure 2:
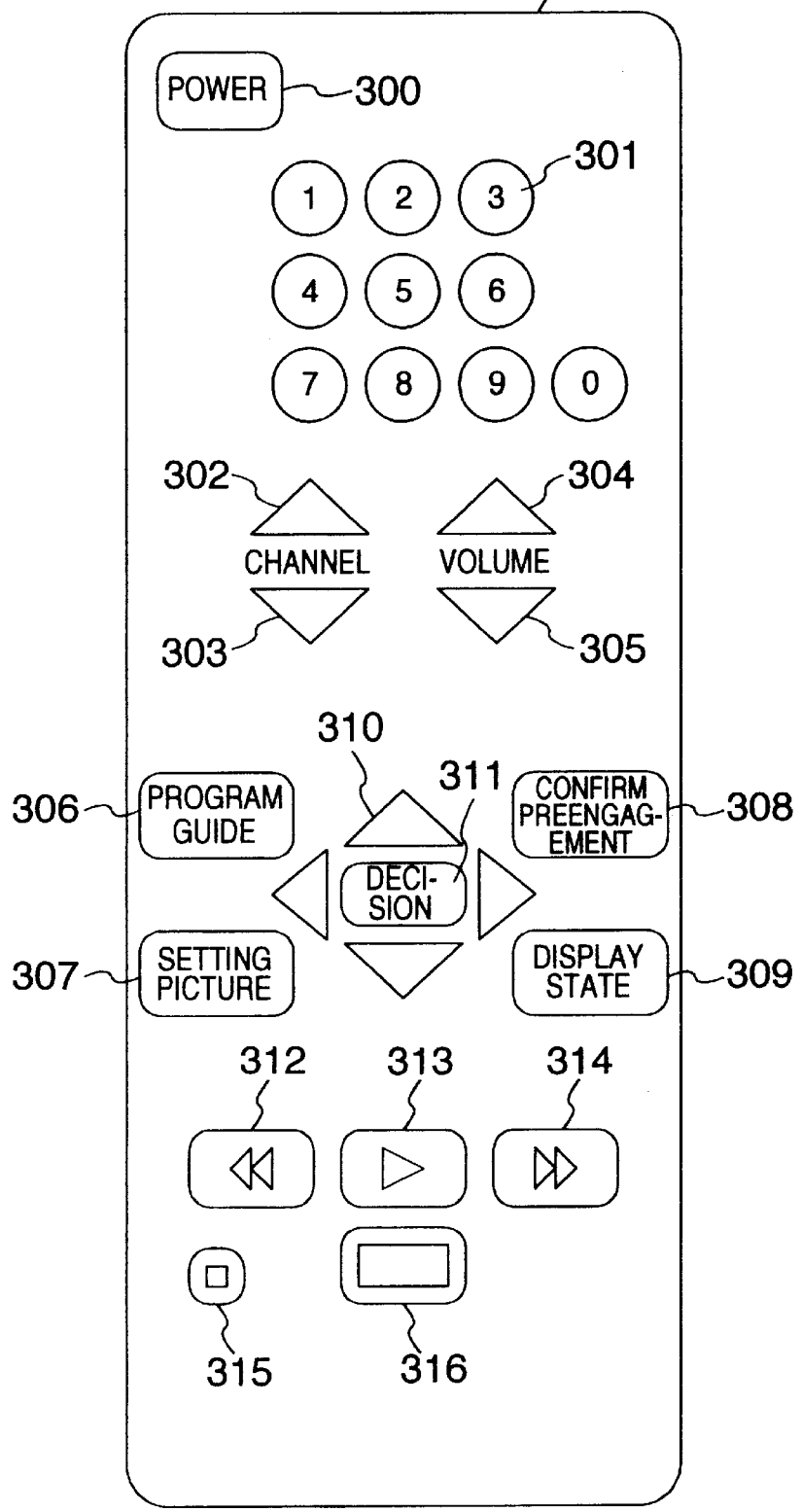
FIG. 2 shows an external appearance of a remote controller used in the present invention.

FIG. 2 shows an example of the remote controller 260 used in the first embodiment of the present invention. In FIG. 2, numeral 300 denotes a power button for turning on and off a power supply of the VTR 100, 301 numerical buttons for inputting numbers, 302 and 303 channel up/down buttons for increasing and decreasing the channel of the VTR 100, 304 and 305 volume up/down buttons for increasing and decreasing the volume of the TV 250, 306 a program guide button for displaying a program guide picture, 307 a setting picture button for displaying a setting picture, 308 a preengagement confirming button for displaying a preengagement confirming picture, 309 a state display button for displaying current operation states of the VTR 100 and the IRD 200 in the superimposition display manner, 310 cursor buttons for moving a cursor on the setting picture and the program guide picture vertically and horizontally, 311 a decision button for deciding an item indicated by the cursor, 312 a rewind button for rewinding a tape, 313 a playback button for playing back the tape, 314 a rapid winding button for winding the tape rapidly, 315 a record button for starting record, and 316 a stop button for stopping movement of the tape.

Referring again to FIG. 1, the VTR 100 includes a magnetic tape constituting a recording medium in which signals are recorded, a magnetic head for recording signals on the magnetic tape, a rotary drum to which the magnetic head is mounted, and a mechanism such as a capstan for moving the magnetic tape, while these elements are not shown in FIG. 1.

Next, constituent elements of the IRD 200 and the TV 250 are described.

Numeral 201 denotes an input terminal for inputting a digital broadcast signal, 202 a digital broadcast receiving tuner for demodulating the inputted digital broadcast signal, and 203 a decoder for converting the digital signal received by the digital broadcast receiving tuner 202 into analog image and audio signals to be outputted. Further, the decoder 203 has the function of displaying the outputted image signal in the superimposition display or the blue-back display manner to display information. In the embodiment, the function of displaying information of the decoder 203 is used to display the setting picture and the preengagement confirming picture in the blue-back display manner. Numeral 204 denotes output terminals for outputting the converted analog image and audio signals. The image and audio signals outputted from the output terminal 204 are supplied to the input terminals 10 of the VTR 100. Numeral 220 denotes an IRD system control circuit for controlling the whole operation of the IRD 200 by controlling all of the constituent elements described above of the IRD 200. Further, the IRD system control circuit 220 is supplied with the digital information signal received by the digital broadcast receiving tuner 202 and extracts information including a program name, a broadcasting time, contents and the like of a broadcast program named program arrangement information from the digital information signal, so that a program guide picture having a list of contents of programs to be broadcasted in a few days can be prepared to be outputted as a picture of an image signal from the decoder 203. Numeral 262 denotes a receiving portion of the remote controller, which sends a user's operation request from the remote controller to the IRD system control circuit 220.

Figure 3:
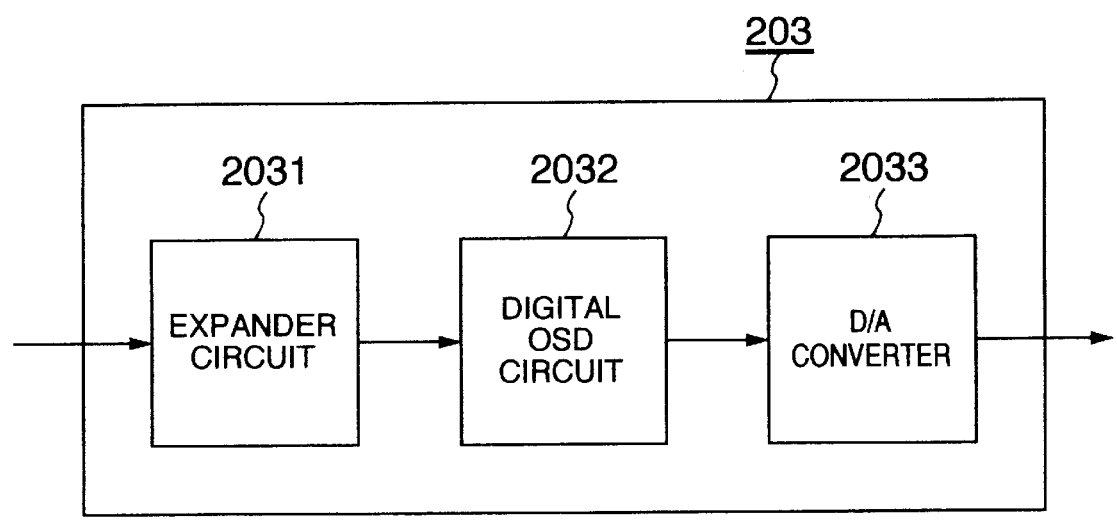
FIG. 3 is a block diagram illustrating a decoder used in the present invention.

FIG. 3 is a block diagram illustrating an internal configuration of the decoder 203, which includes an expander circuit 2031 for expanding a compressed digital signal, a digital on-screen display circuit (hereinafter referred to as digital OSD) 2032 for digitally superimposing information on an image portion of the digital signal, and a D/A encoder 2033 for converting the digital signal into analog image and audio signals. The superimposition display and the blue-back display are actually performed by the digital OSD circuit 2032.

Referring again to FIG. 1, numeral 251 denotes input terminals for inputting image and audio signals for the TV 250 supplied from the output terminals 16 of the VTR 100, and 252 denotes a monitoring picture for displaying an inputted image signal.

The VTR 100 and the IRD 200 are connected through a communication line 270. Numerals 271 and 272 represent connection terminals of the communication line 270.

When communication contents used in the first embodiment of the present invention are divided into a subject, a verb, a subjective object and an objective complement, the subject represents an apparatus for a transmission source, the object represents specific operation states or set contents of a receiving destination, the verb represents setting or acquirement of a value for data indicated by the object, and the objective complement represents contents set when the verb is set.

For example, when the IRD 200 sets the VTR 100 to a recording state, it is set that the subject=IRD, the verb=set, the subjective object=a moving state of the VTR and the objective complement=record. Such a function of setting a state of the opposite apparatus allows the VTR 100 to turn on and off the power supply of the IRD 200 and change the channel and further allows the IRD 200 to change over a moving state of the VTR 100 to the record, stop, playback state or the like. Accordingly, the power supplies of the VTR 100 and the IRD 200 can be interlocked with each other to be turned on.

Further, when the VTR 100 makes inquiries at the IRD 200 about the number of a channel being received, it is set that the subject=VTR, the verb=obtain and the subjective object=the channel number of the tuner of the IRD. Such a function of obtaining the state of the opposite apparatus allows the VTR 100 to monitor the operation state of the IRD 200 to detect a change thereof. Accordingly, when the operation state is changed, a latest state of the IRD 200 can be displayed as characters or a picture by the analog OSD circuit 15. In the embodiment, a picture such as a state display picture for notifying information including the operation state of the IRD 200 to a user in the superimposition display manner is displayed by the analog OSD circuit 15 controlled by the VTR system control circuit 20.

Further, the protocol includes means for understanding kinds of the subjective objects and names thereof included in the opposite apparatus and kinds of the objective complements and names thereof capable of being set in the subjective objects. This function allows the IRD 200 to obtain kinds of items to be set in the VTR 100 and names of the items and kinds of subitems to be selected for each of the items and names of the subitems and allows the digital OSD circuit 2032 to display a setting picture for the VTR 100. In the first embodiment of the present invention, a picture such as the setting picture and the preengagement picture for notifying information including information of the VTR 100 to the user in the blue-back display manner is displayed by the digital OSD circuit 2032 controlled by the IRD system control circuit 220.

The reason why allotment of display of information is made is as follows:

Since the digital OSD circuit 2032 has the function of displaying a picture for guiding digital broadcast programs, the digital OSD circuit 2032 has a merit that the resolution of a picture is higher, the number of colors is larger and kanjis higher than the first level can be displayed as compared with the analog OSD circuit 15, while characters cannot be displayed on the background of an image outputted by the analog broadcast receiving tuner 12 or an image reproduced by the magnetic head. Accordingly, in the embodiment, the allotment is made so that the superimposition display is made by the analog OSD circuit 15 and the blue-back display is made by the digital OSD circuit 2032.

Actual communication between the VTR 100 and the IRD 200 is made between the VTR system control circuit 20 and the IRD system control circuit 220. Further, when the VTR 100 and the IRD 200 are communicating with each other exactly, all of user's operation requests transmitted by the remote controller 260 are received by the VTR system control circuit 20 and the IRD system control circuit 220 interrupts the receiving operation thereof.

Operation of the recording and reproducing apparatus when various buttons of the remote controller 260 are depressed is now described as follows:

In FIG. 2, when the power button 300 of the remote controller 260 is depressed, the VTR system control circuit 20 turns on the power supply of the VTR 100 and transmits a request for turning on the power supply to the IRD 200. The IRD system controller 220 receives the request and turns on the power supply of the IRD 200. Thus, the power supplies of the VTR 100 and the IRD 200 are turned on in interlocked relationship with each other.

At this time, in FIG. 1, when contacts of the input change-over switches 13 are in the connected state to respective A-sides thereof by means of the user's operation, an analog broadcast signal inputted from the input terminal 11 to the VTR 100 is converted into image and audio signals by the analog broadcast receiving tuner 12. The image and audio signals are outputted through the input change-over switches 13, the signal processing circuits 14 and the analog OSD circuit 15 (only the image signal) from the output terminals 16, so that the program received by the analog broadcast receiving tuner can be viewed and heard by the TV 250. Further, when the contacts of the input change-over switches 13 are in the connected state to respective D-sides thereof, a digital broadcast signal inputted from the input terminal 201 to the IRD 200 is converted into a digital information signal by the digital broadcast receiving tuner 202 and further converted into analog image and audio signals by the decoder 203 to be outputted from the output terminals 204. Furthermore, these signals are inputted from the input terminals 10 to the VTR 100 and outputted through the input change-over switches 13, the signal processing circuits 14 and the analog OSD circuit 15 (only the image signal) from the output terminals 16, so that the digital broadcast program can be viewed and heard by the TV 250.

Next, in FIG. 2, when the state display button 309 of the remote controller 260 is depressed, the VTR system control circuit 20 performs the following processing in accordance with the connection state of the input change-over switches 13.

In FIG. 1, when the contacts of the input change-over switches 13 are in the connected state to the A-sides thereof by the user's operation, the VTR system control circuit 20 sends information concerning an operation mode of the VTR 100 such as "stop, record and playback" and information of a reception channel of the analog broadcast receiving tuner 12 to the analog OSD circuit 15 and instructs the analog OSD circuit 15 to superimpose the information on the image signal.

Next, when the contacts of the input change-over switches 13 are in the connected state to the D-sides thereof by the user's operation, the VTR system control circuit 20 obtains from the IRD 200 the channel number received by the digital broadcast receiving tuner 202 and displays information of the operation mode of the VTR and the obtained reception channel of the digital broadcast by means of the analog OSD circuit 15.

Further, when the channel up button 302 of the remote controller 260 is depressed, the VTR system control circuit 20 performs the following processing in accordance with the connection state of the input change-over switches 13. Further, numeral 303 denotes a channel down button for decreasing the channel.

In FIG. 1, when the contacts of the input change-over switches 13 are in the connected state to the A-sides thereof by the user's operation, the VTR system control circuit 20 searches for a channel number of the analog broadcast to be selected next and controls to tune the analog broadcast receiving tuner 12 to the searched channel. Further, the VTR system control circuit 20 issues a display request of the channel number to the analog OSD circuit 15 to display an image of the selected analog broadcast and the channel number thereof on the monitoring picture 252. Operation of the VTR 100 at this time is the same as operation of the conventional VTR.

Next, in FIG. 1, when the contacts of the input change-over switches 13 are in the connected state to the D-sides thereof by the user's operation, the VTR system control circuit 20 sends a channel up request to the IRD 200. When the IRD system control circuit 220 receives the request, the IRD system control circuit searches for a channel number of digital broadcast to be selected next and controls to tune the digital broadcast receiving tuner 202 to the searched channel. When the VTR system control circuit 20 detects change of the reception channel of the IRD 200, the VTR system control circuit 20 issues a display request of the channel number to the analog OSD circuit 15 to display a image of the selected digital broadcast and the channel number thereof on the monitoring picture 252.

The above operation describes an example of the channel selection method that a broadcast signal is selected by means of the input change-over switches 13 and a desired channel is selected by means of the channel up/down button. It is considered that, for example, channels are successively circulated in a loop including the analog and digital broadcast channels in response to the channel up button or a desired channel of a desired broadcast is directly selected by the numerical button and contents of communication and control between the VTR 100 and the IRD 200 at this time can be conjectured easily and accordingly are not described particularly.

In FIG. 2, when the setting picture button 307 of the remote controller 260 is depressed, the VTR system control circuit 20 sends a setting picture display request to the IRD 200 since the setting picture is displayed by the decoder 203 of the IRD 200. When the IRD system control circuit 220 receives the request, the IRD system control circuit prepares data for the setting data and sends the display request to the decoder 203. Further, when the VTR system control circuit 20 detects that the IRD 200 has displayed the setting picture, the VTR system control circuit connects the contact of the image input change-over switch 13V to the D-side thereof. Consequently, the setting picture produced by the IRD 200 is inputted from the input terminal 10V to the VTR 100 and supplied through the image input change-over switch 13V, the image signal processing circuit 14V, the analog OSD circuit 15 and the output terminal 16V to the input terminal of the TV 250 to be displayed on the monitoring picture 252.

Figure 4:
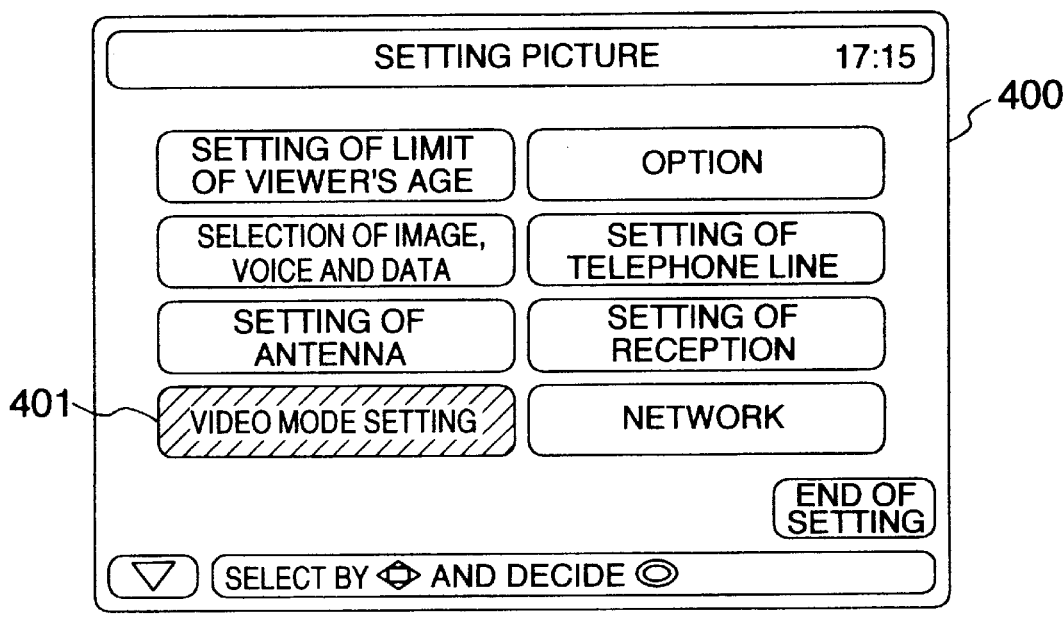
FIG. 4 shows an example of a setting picture displayed by an IRD in the present invention.
Figure 4:
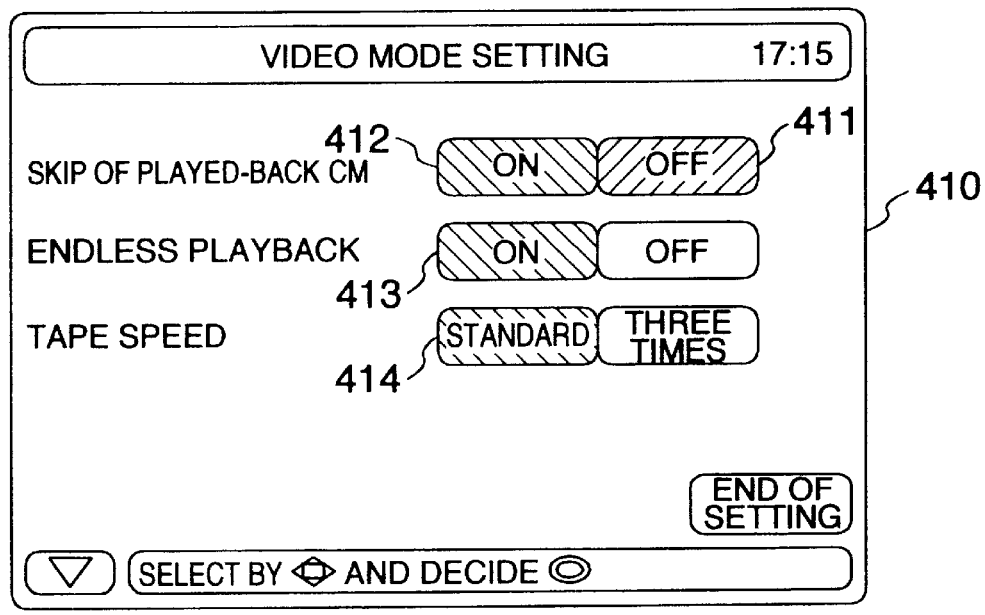

FIG. 4 shows an example of the setting picture displayed by the IRD 200 shown in FIG. 1. A picture 400 shows an example of a selection picture in which various setting pictures are selected. A hatched portion 401 shows a cursor position being selected currently.

When the VTR system control circuit 20 receives a request of a button used in the setting picture while the IRD 200 displays the setting picture, the VTR system control circuit 20 sends contents of the request to the IRD 200 unconditionally, so that the IRD system control circuit 220 changes over the setting picture in accordance with the received contents or changes contents of set items. Buttons used in the setting picture include the cursor button 310 for selecting the set items in the setting picture, the decision button 311 for deciding the selected item, and the numerical buttons 301 for inputting numbers.

In the setting picture 400, when the decision button 311 is depressed while the cursor is positioned on "Video Mode Setting", the IRD system control circuit 220 obtains from the VTR 100 kinds of items to be set and names of the items, subitems thereof to be selected and names of the subitems and current set contents to prepare a setting picture for VTR and causes the decoder 203 to display a video mode setting picture.

A picture 410 shows an example of the video mode setting picture displayed by the IRD 200. In the video mode setting picture, numeral 411 represents a current cursor position and numeral 412, 413 and 414 represent currently selected items. A user moves the cursor onto a subitem of the item in which set contents are to be changed and depresses the decision button 311 to change the set contents. In the picture 410, when the decision button 311 is depressed, a "Skip of Played-back CM" mode is changed from "on" to "off".

When contents of the set item are changed, the IRD system control circuit 220 sends contents of the changed item to the VTR 100. The VTR system control circuit 200 receives the contents and rewrites internal state data.

When the decision button 311 is depressed while the cursor is positioned on "End of Setting" in the setting picture, the IRD system control circuit 220 detects it and finishes displaying the setting picture. When the VTR system control circuit 20 detects that display of the setting picture has been finished, the VTR system control circuit 20 returns the processing of the operation request of the remote controller 260 to the usual operation and returns the image input change-over switch 13V to the state before displaying a menu picture.

When the IRD 200 is displaying the setting picture, the VTR system control circuit 20 neglects a state display request from the remote controller 260. Further, when the setting picture is displayed during displaying the state, the display of the state is finished. This reason is that the setting picture displayed by the IRD 200 in the blue-back display manner and the state display picture displayed by the VTR 100 in the superimposition display manner do not overlap each other.

Further, the VTR system control circuit 20 neglects the setting picture display request from the remote controller 260 during recording. This reason is that it is prevented that an image signal to be recorded becomes a setting picture.

When the program guide button 306 of the remote controller 260 is depressed, the VTR system control circuit 20 requests a program guide display from the IRD 200. When the IRD system control circuit 220 receives the request, the IRD system control circuit 220 extracts information such as program names, broadcasting times and contents of broadcast programs from program-arranged information included in the digital information signal received by the digital broadcast receiving tuner 202 and prepares a program guide picture having a list of contents of programs to be broadcasted in a few days. Further, the IRD system control circuit 220 obtains the channel number registered in the VTR 100 and converts an analog broadcast channel into a form included in the program guide picture.

Figure 5:
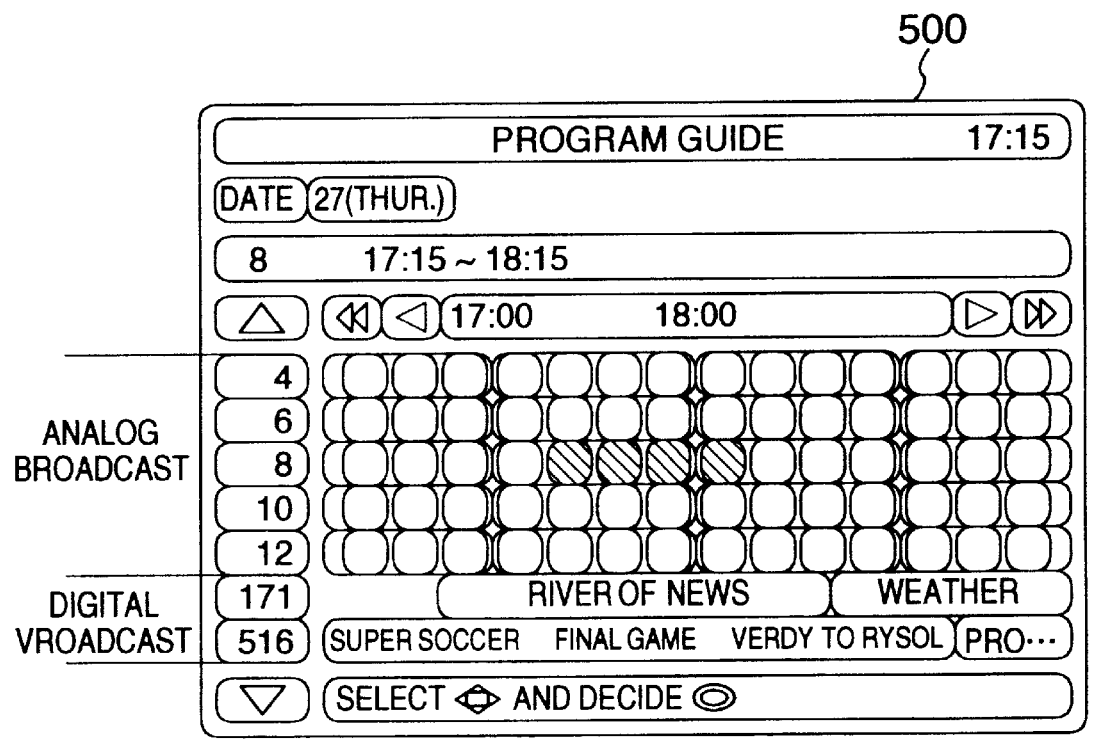
FIG. 5 shows an example of a program guide picture displayed by the IRD in the present invention.

FIG. 5 shows an example of a program guide picture displayed in the first embodiment of the present invention. The channel numbers equal to or larger than 100 represent the digital broadcast programs, in which titles and broadcasting times obtained from the program arrangement information are displayed. The channel numbers smaller than 100 represent the analog broadcast programs. Each channel is divided into blocks each having 15 minutes.

When a digital broadcast program is preengaged, the cursor is moved on a desired program and the program is determined by the decision button 311. When the desired program is determined, the IRD system control circuit 220 extracts a channel number, a start time and an end time of the determined program as preengagement information and sends the information to the VTR 200. The VTR system control circuit 20 receives the information and preserves it.

When an analog broadcast program is preengaged, some blocks each having 15 minutes for a desired channel are selected so that a start time and an end time are decided in units of 15 minutes. A block corresponding to the start time of the desired channel is selected to be decided and a block corresponding to the end time of the same channel is then selected to be decided so that all of blocks included between the start block and the end block are selected. The picture 500 indicates that an analog broadcast channel 8 is preengaged at 17:15 to 18:15 on Thursday, 27th. The IRD system control circuit 220 extracts the channel number, the start time and the end time from the plurality of selected blocks as preengagement information. The VTR system control circuit 20 receives the information and preserves it.

When the preengagement confirming button 308 of the remote controller 260 is depressed, the VTR 100 and the IRD 200 perform the same communication and operation as at the time of displaying the setting picture described above. However, in order to prepare the preengagement confirming picture, the following operation is added thereto. That is, the IRD system control circuit 220 sends the VTR 100 to a request for obtaining contents of preengagement preserved in the VTR 100 and receives a replay from the VTR 100 to prepare the preengagement confirming picture.

When preengagement contents are deleted in the preengagement confirming picture, the IRD system control circuit 220 sends a deletion request for the specific deleted preengagement to the VTR 100 and the VTR system control circuit 20 receives the request and deletes the pertinent preengagement information from the preserved preengagement contents.

In the first embodiment of the present invention, the contents of the preengagement is preserved in the VTR 100, while preengagement contents for analog broadcast may be preserved in the VTR 100 and preengagement contents for digital broadcast may be preserved in the IRD 200 by way of example. Further, all of preengagement contents may be preserved in the IRD 200.

In this case, operations in transmission and reception of preengagement information upon completion of setting preengagement, transmission and reception of a request for obtaining preengagement information upon displaying a preengagement confirming picture and transmission and reception of a deletion request upon deletion of preengagement are different from the operations described above, while the operations can be considered easily and accordingly description thereof is omitted.

When the playback button 313 of the remote controller 260 is depressed, the VTR system control circuit 20 sets the signal processing circuit 14 and the mechanism such as the rotary drum and the capstan to a playback mode to set operation of the VTR 100 to the playback state. Simultaneously, a display request of character "Playback" is instructed to the analog OSD circuit 15.

Signals reproduced by the magnetic head are reproduced by the image and audio signal processing circuit 14 and are outputted through the analog OSD circuit 15 (only image signal) from the output terminals 16, so that image and voice being reproduced can be viewed and heard by the TV 250.

Further, operation in the case where the menu picture and the preengagement picture are displayed during playback is the same as the operation upon stop described above.

When the record button 315 of the remote controller 260 is depressed, the VTR system control circuit 20 sets the signal processing circuit 14 and the mechanism such as the rotary drum and the capstan to a record mode to set operation of the VTR 100 to a record state. Simultaneously, a display request of character "Record" and the number of channel being recorded is issued to the analog OSD circuit 15.

Signals selected by the input change-over switch 13 are subjected to record processing in the image and audio signal processing circuit to be recorded on the magnetic tape by means of the magnetic head and are outputted through the analog OSD circuit 15 from the output terminals 16, so that image and voice being recorded can be viewed and heard by the TV 250.

Although described has been made above, the VTR system control circuit 20 does not receive the display requests of the setting picture and the preengagement confirming picture from the remote controller 260 during record. This reason is that image signals to be recorded are prevented from being displayed on the setting picture and the preengagement confirming picture.

Finally, record by preengagement is described. In the embodiment the VTR 100 preserves preengagement information and accordingly description is made to an example in which execution of preengagement is also performed by the VTR 100.

Execution of preengagement for analog broadcast is first described.

When the start time for preengagement is reached, the VTR system control circuit 20 turns on the power supply of the VTR 100 and connects the contacts of the input change-over switches 13 to the A-sides. Further, the VTR system control circuit 20 tunes the analog broadcast receiving tuner 12 to a preengaged channel to start recording, so that a preengage analog broadcast program is recorded. Furthermore, when the end time for preengagement is reached, the recording is finished and the power supply of the VTR 100 is turned off.

Next, execution of preengagement for digital broadcast is described.

When the start time for preengagement is reached, the VTR system control circuit 220 turns on the power supplies of the VTR 100 and the IRD 200 and connects the contacts of the input change-over switches to the D-sides. Further, the IRD 200 is tuned to a preengaged channel to start recording, so that a preengaged digital broadcast program is recorded. Furthermore, when the end time for preengagement is reached, the recording is stopped and the power supplies of the VTR 100 and the IRD 200 are turned off.

In the embodiment, since the VTR 100 preserves all of preengagement contents, the VTR 100 performs preengagement, whereas it is also considered that all of preengagement contents are preserved in the IRD 200 and the IRD 200 performs preengagement. In this case, a series of operations including the turning-on of the power supplies of the VTR 100 and the IRD 200, the change-over control of the input change-over switches 13, the tuning of the analog or digital broadcast receiving tuner and the start of recording by the VTR 100 are considered to be performed by the IRD 200. Since similar operations can be made by various methods and these methods can be considered easily, description thereof is omitted.

Further, when the VTR 100 cannot communicate with the IRD 200, the VTR system control circuit 20 judges that the IRD 200 is not connected to the communication line 270 and returns the operation of the VTR to the conventional operation, in which the setting picture, the preengagement picture and the like are displayed by means of the analog OSD circuit 15. Similarly, when the IRD 200 cannot communicate with the VTR 100, the IRD system control circuit 220 judges that the VTR 100 is not connected to the communication line 270 and returns the operation of the IRD to the conventional operation, in which the states of the current receiving channel number and the like is displayed by means of the decoder 203.

Operations of the VTR 100 and the IRD 200 at this time are made by using the respective exclusive remote controllers.

Figure 6:
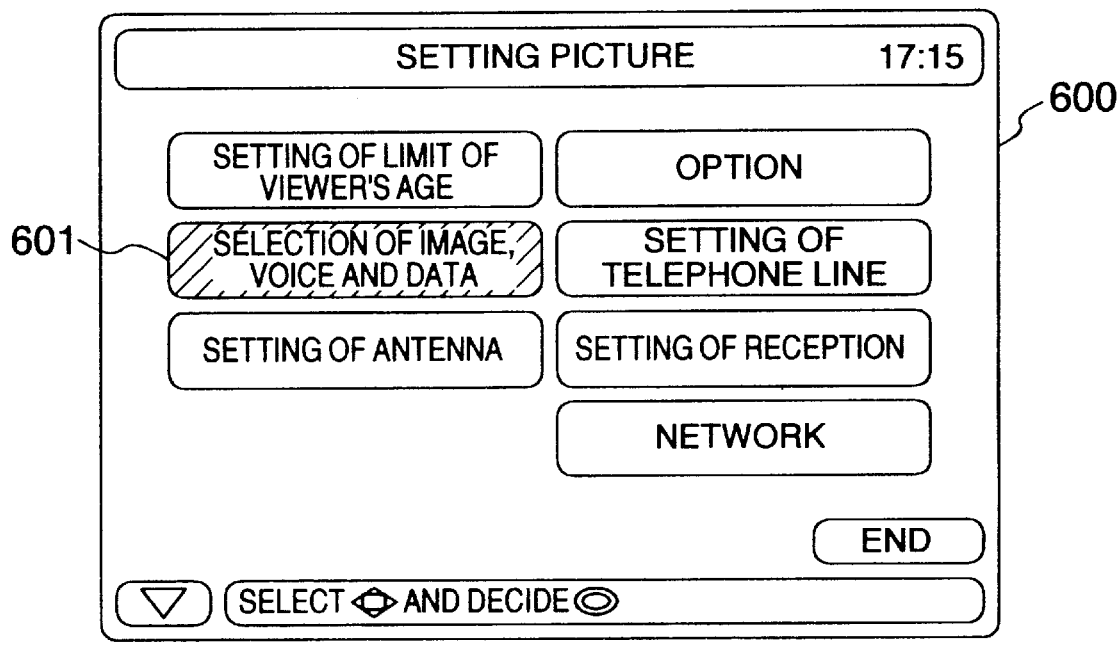
FIG. 6 shows an example of a setting picture displayed by a conventional IRD.
Figure 6:
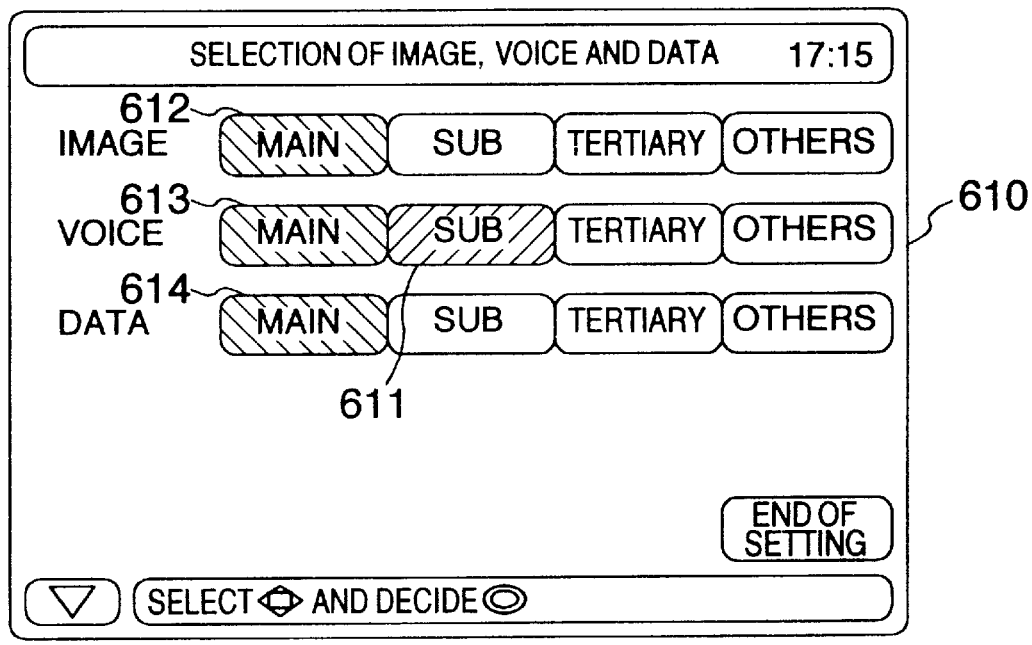
Figure 7:
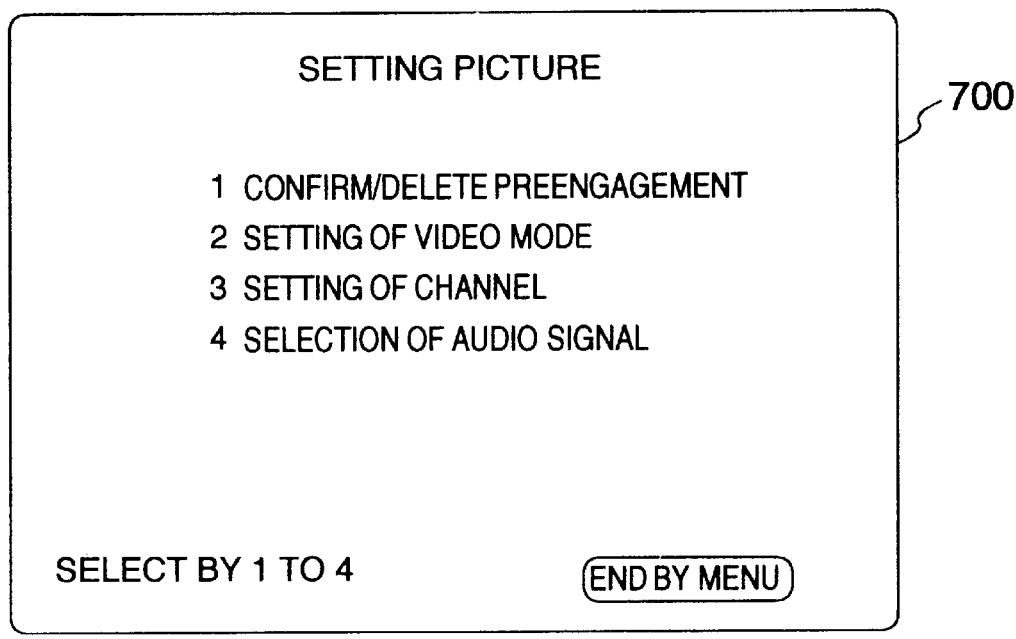
FIG. 7 shows an example of a setting picture displayed by a conventional VTR.
Figure 7:
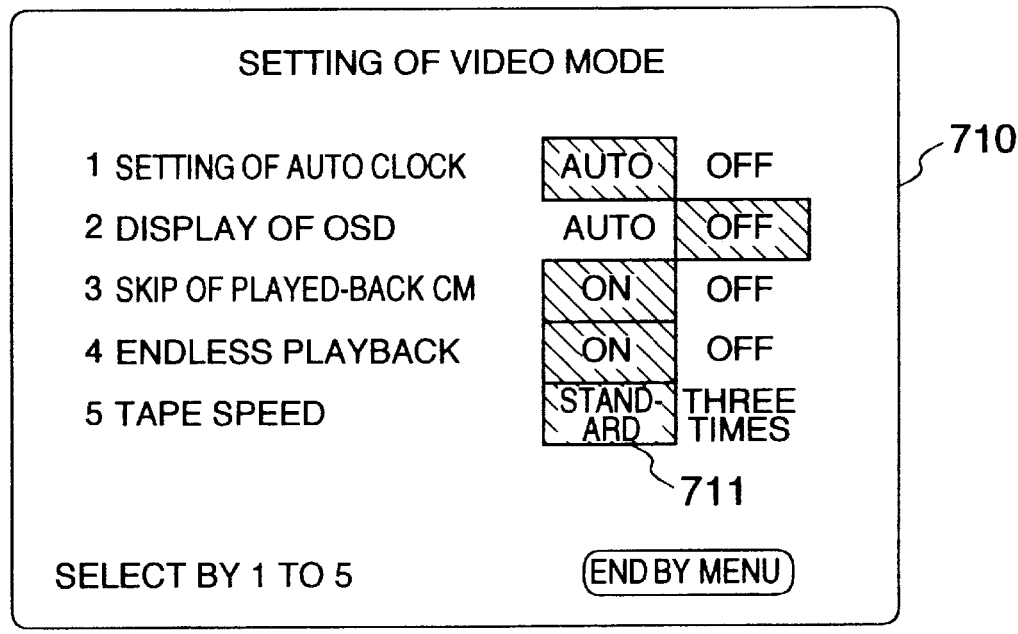

FIGS. 6 and 7 show respective setting pictures displayed by the IRD 200 and the VTR 100 in the prior art when the VTR 100 and the IRD 200 cannot communicate with each other. Operation at the time when the sub-voice of digital broadcast is recorded at the speed of three times is now described with reference to FIGS. 6 and 7.

A method of selecting voice of the IRD to the sub-voice by using an IRD exclusive remote controller is first described.

First of all, the setting picture button is depressed to display a selection picture 600 of the setting picture. In the picture displayed by the IRD 200, the cursor is moved onto a desired item by means of the cursor buttons and the decision button is depressed, so that the setting picture of the item relative to contents thereof is displayed. The hatched portion 601 represents a position of the cursor.

In this example, in order to select the audio signal, the cursor is moved onto the portion "Selection of Image, Voice, Data" and the decision button is depressed to thereby display the setting picture 610 of image, voice and data. The hatched portion 611 indicates a current position of the cursor and the hatched portions 612, 613 and 614 indicate currently set items. In the setting picture 610, since the "Main" voice is set as voice, the cursor is moved onto the portion of "Sub"-voice and the decision button is depressed to thereby change the setting to "Sub"-voice. Finally, the cursor is moved to the "End of Setting" positioned at right lower corner of the picture and the decision button is depressed to finish the setting of voice.

Next, a method of setting a tape speed for record of the VTR to three times by using the VTR exclusive remote controller is described.

The setting picture button is first depressed to display a selection picture 700 of the setting picture. In the picture displayed by the VTR 100, when a number button corresponding to setting contents desired to be changed is depressed, a setting picture of an item pertinent to the contents is displayed. In this example, the number button "2" is depressed and a video mode setting picture 710 is displayed. The hatched portions 711 indicate currently set contents. Since the current tape speed for record is set to "Standard", the number button "5" is depressed to set the tape speed for record to "Three Times". Further, when the number button "5" is depressed again, the tape speed for record is returned to "Standard". Finally, the setting picture button is depressed to finish the setting.

Finally, the record button is depressed to set the VTR 100 to the record state, so that the digital broadcast program can be recorded in the form of "Sub-voice and three-times mode".

Figure 8:
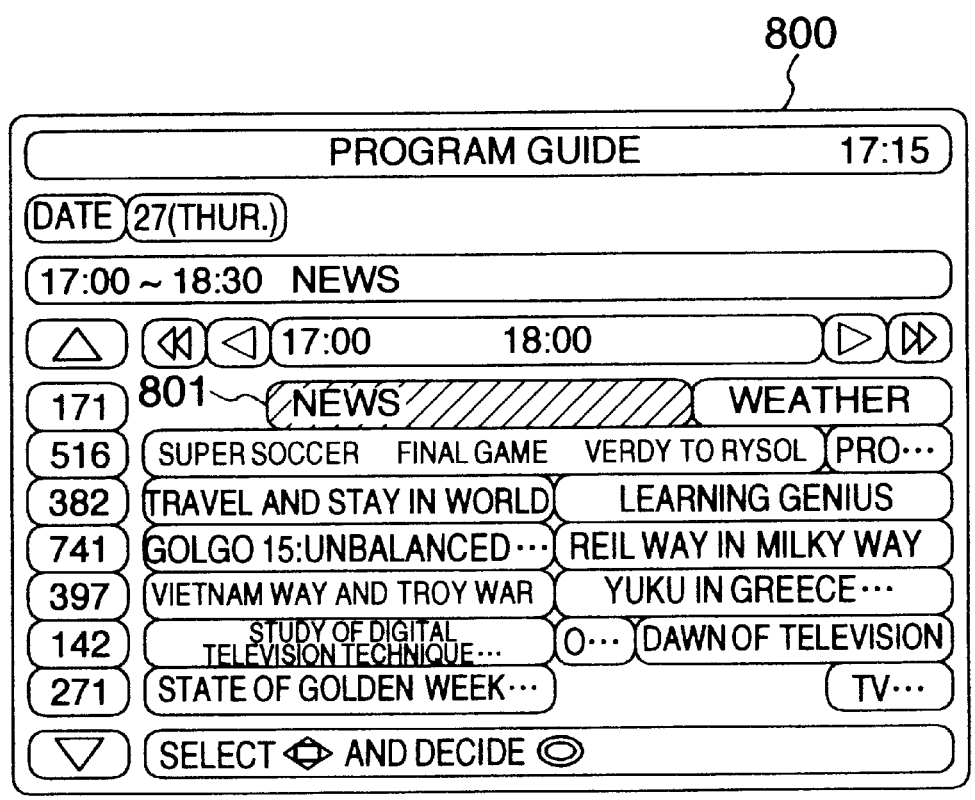
FIG. 8 shows an example of a program guide picture displayed by the conventional IRD.
Figure 9:
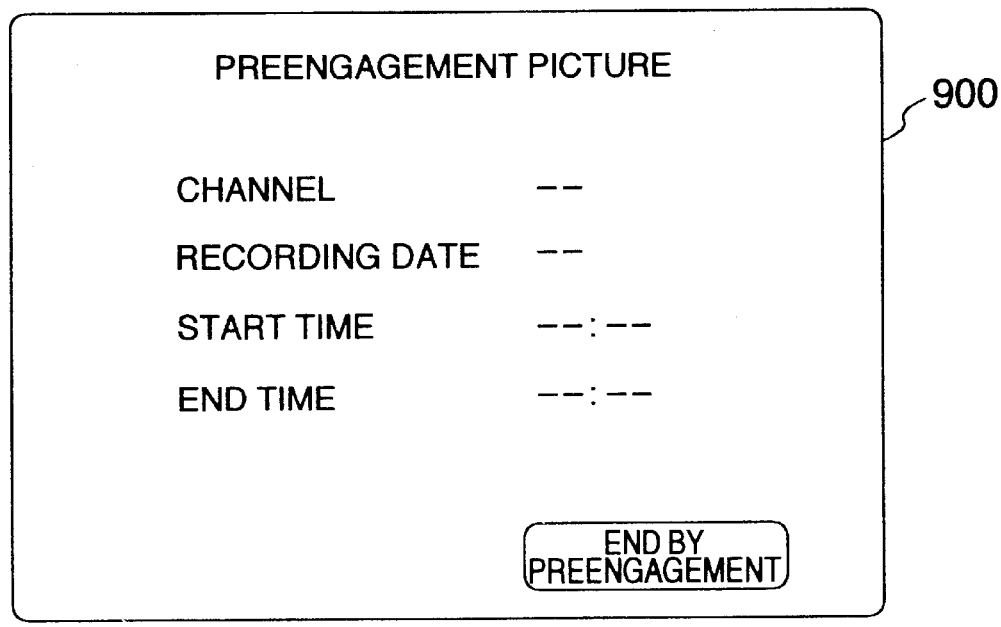
FIG. 9 shows an example of a preengagement setting picture displayed by the conventional VTR.
Figure 9:
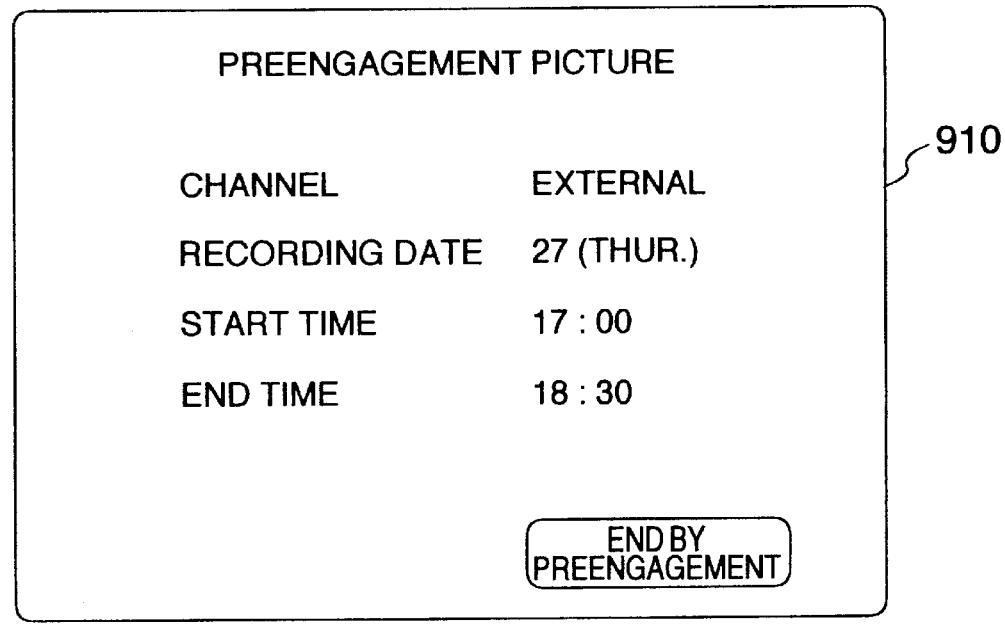

FIGS. 8 and 9 show the program guide picture displayed by the IRD 200 and the preengagement setting picture displayed by the VTR 100 in the prior art when the VTR 100 and the IRD 200 cannot communicate with each other. Operation at the time that video recording of digital broadcast is preengaged is now described with reference to FIGS. 8 and 9.

A method for preengaging a desired program by the IRD by using the IRD exclusive remote controller is first described.

First of all, the program guide button is depressed to display a program guide picture 800. A list of broadcasting times and titles of a program to be broadcast in a few days is displayed on the program guide picture. When the cursor is moved onto a desired program on the program guide picture by means of the cursor buttons and the decision button is depressed, the program is preengaged. The hatched portion 801 indicates a current position of the cursor. In the picture 800, news broadcasted by a channel 171 at 17:00 to 18:30 on Thursday, 17th is about to be preengaged. In this state, when the decision button is depressed, the news is preengaged and when the predetermined time is reached, reception of the channel 171 is started.

Next, a method of setting preengagement of the VTR by using the VTR exclusive remote controller is described.

First of all, the preengagement setting button is depressed to display a preengagement setting time 900. In the preengagement setting picture, a channel, a recording date, a start time and an end time are inputted by the numerical buttons and preengagement is set. When "00" is inputted for the channel, a signal inputted from the external input terminal of the VTR is selected. A picture 910 shows a picture when the numerical buttons are depressed in order of "002717001830" and contents of preengagement are that the external input signal is recorded at 17:00 to 18:30 on 27th". When all of items are inputted and the preengagement setting button is depressed, the set preengagement is preserved and the preengagement picture is finished.

As described above, in order to preengage to video-record a digital broadcast program, it is necessary to set preengagement in both of the IRD and the VTR. Further, the user is required to memorize a broadcasting date and hour, a start time and an end time of a program preengaged by the IRD and input these information in the VTR.

As described above, in the prior art, when the VTR 100 and the IRD 200 cannot communicate with each other, the user's operation is very complicated, while it is possible to record a digital broadcast program in a desired mode and make preengagement record.

Figure 10:
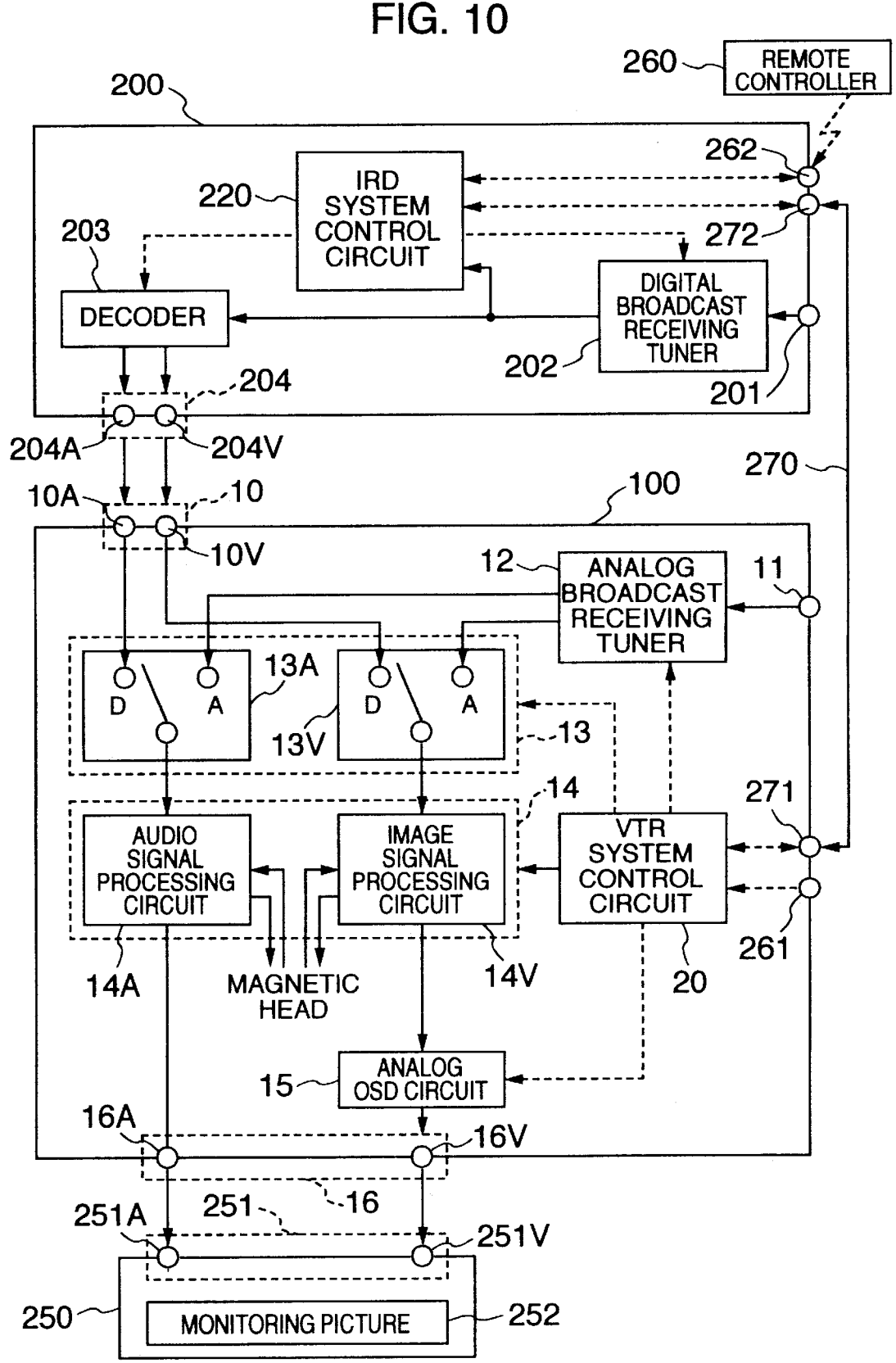
FIG. 10 is a block diagram schematically illustrating a second embodiment of an image recording and reproducing apparatus according to the present invention.

FIG. 10 is a block diagram schematically illustrating a second embodiment of an image recording and reproducing apparatus according to the present invention.

In the second embodiment, an operation request from the remote controller 260 is received by the IRD 200 and the IRD 200 and the VTR 100 are operated. In FIG. 10, numeral 262 denotes a receiving portion of the remote controller, which sends the user's operation request from the remote controller 260 to the IRD system control circuit 220.

Operation of the apparatus shown in FIG. 10 when the setting picture button 307 of the remote controller 260 of FIG. 2 is depressed is now described.

When the setting picture button 307 of the remote controller 260 is depressed, the IRD system control circuit 220 detects it and prepares the setting picture. Further, the IRD system control circuit 220 supplies a display request to the decoder 203. The VTR system control circuit 20 detects that the IRD 200 has displayed the setting picture and connects the contact of the image input change-over switch 13V to the D-side. Thus, the setting picture is displayed on the monitoring picture 252.

When the VTR 100 is performing record, the VTR system control circuit 20 sends a request of ending the setting picture to the IRD 200 so that the image signal being recorded is prevented from being displayed on the setting picture and the state of the image input change-over switch 13V is left as it is.

In this method, however, when the digital broadcast program is recorded, the setting picture is recorded on the magnetic tape until the IRD 200 receives the end request of the setting picture from the VTR 100. Accordingly, the following operation can be considered. Before the IRD begins to display the setting picture, the image produced by the VTR 100 is required to be changed to an image for digital broadcast. If it is rejected by the VTR 100, display is canceled. The IRD system control circuit 220 monitors the moving state of the VTR 100 to cancel a display request of the setting picture while the VTR 100 performs recording.

Further, it is also considered that both of the exclusive remote controllers of the VTR 100 and the IRD 200 are used to make operation. Contents of communication and operation of the VTR 100 and the IRD 200 at this time can be conjectured easily and accordingly description thereof is omitted.

Figure 11:
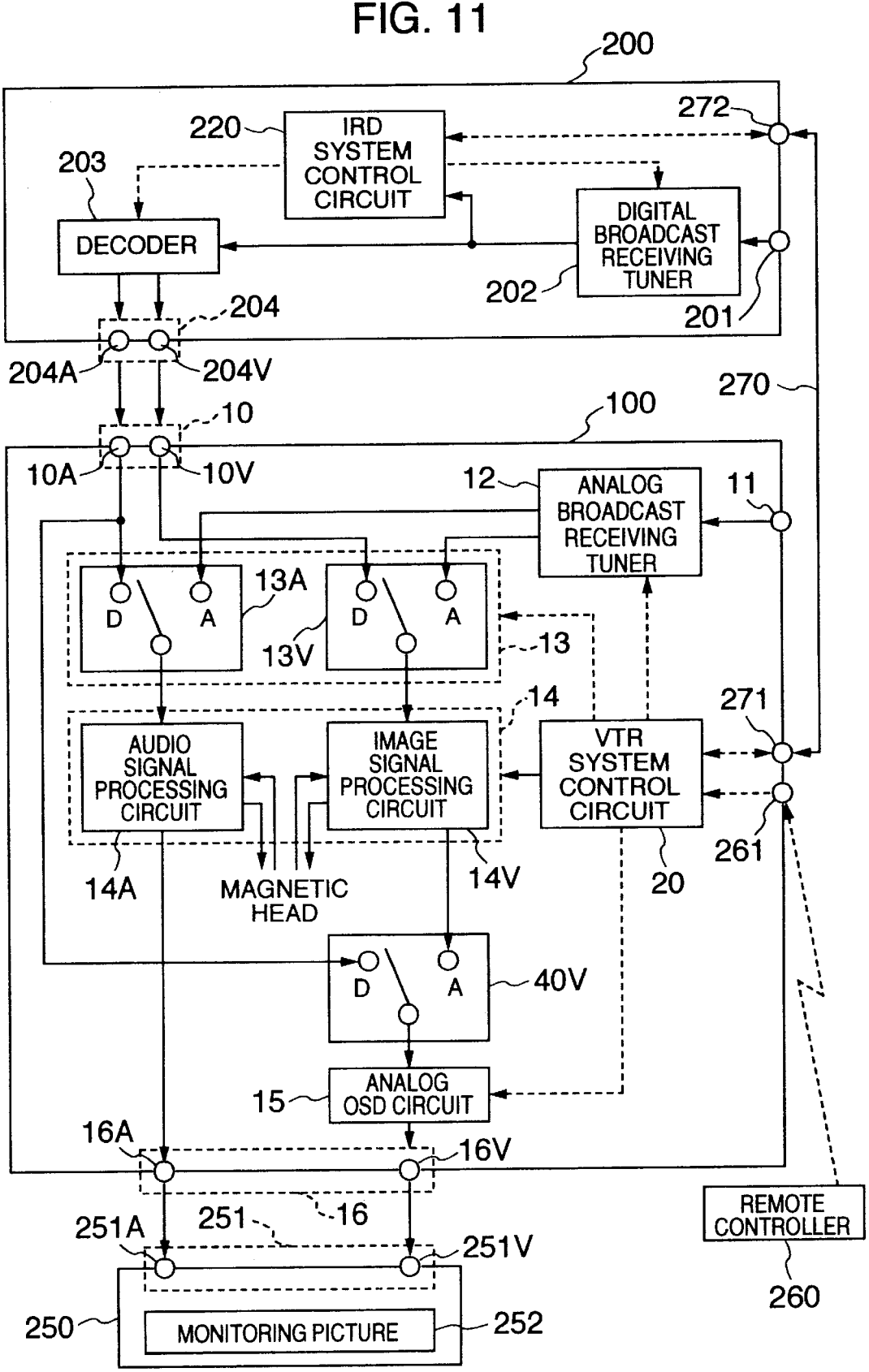
FIG. 11 is a block diagram schematically illustrating a third embodiment of an image recording and reproducing apparatus according to the present invention.

FIG. 11 is a block diagram schematically illustrating a third embodiment of an image recording and reproducing apparatus according to the present invention.

In the embodiment, an image output change-over switch 40V is disposed just before the analog OSD circuit to select an image signal recorded and reproduced by the VTR 100 and an image signal supplied from the IRD to be outputted.

In the embodiment, since the contact of the image output change-over switch 40V can be connected to the D-side to produce the setting picture displayed by the IRD 200 from the VTR 100, information can be displayed by the IRD 200 while a program of analog broadcast is recorded.

Figure 12:
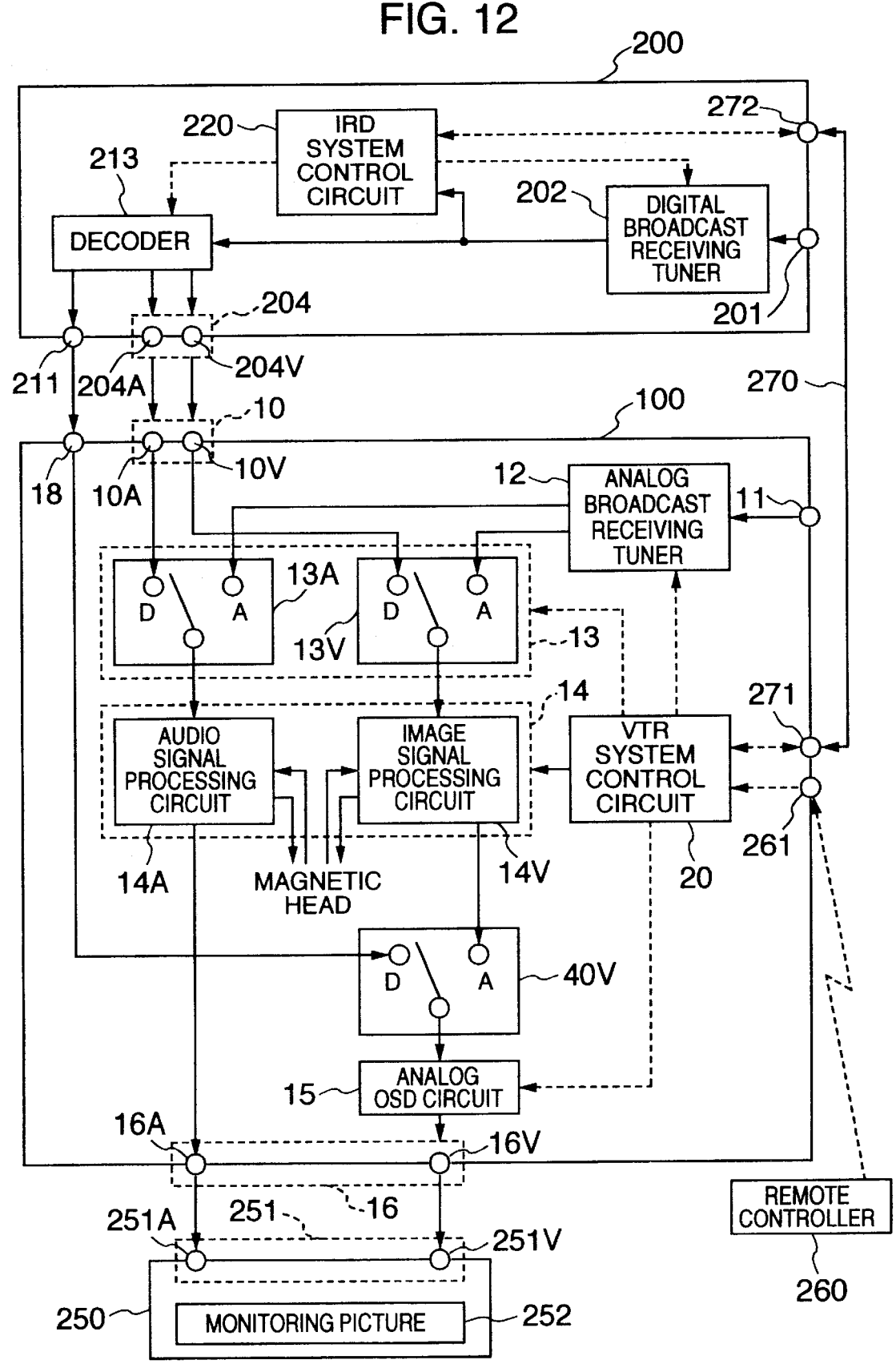
FIG. 12 is a block diagram schematically illustrating a fourth embodiment of an image recording and reproducing apparatus according to the present invention.

FIG. 12 is a block diagram schematically illustrating a fourth embodiment of an image recording and reproducing apparatus according to the present invention. In the fourth embodiment, a decoder 213 which produces an image signal for record for always displaying an image of digital broadcast in addition to an image signal for displaying information by means of the digital OSD circuit 2032 is provided instead of the decoder 203 used in FIG. 1.

Figure 13:
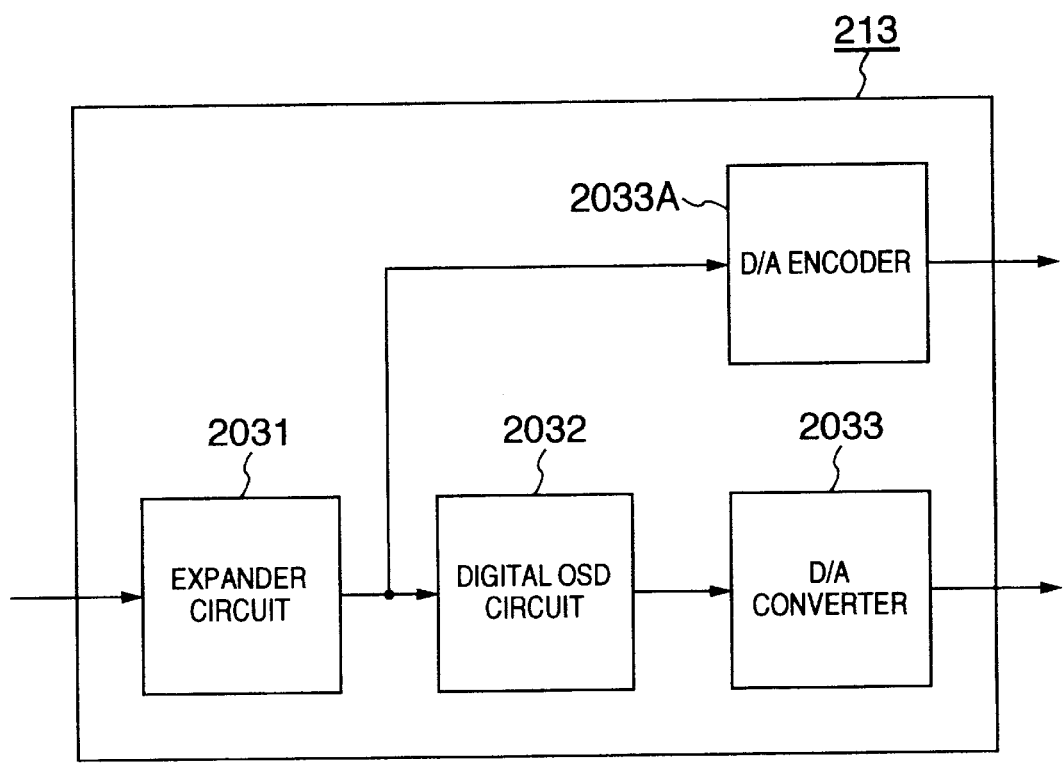
FIG. 13 is a block diagram illustrating a decoder used in the fourth embodiment of the present invention shown in FIG. 12.

FIG. 13 is a block diagram illustrating internal constituent elements of the decoder 213 shown in FIG. 12. In the decoder 213 of FIG. 13, a D/A encoder 2033A is added to the decoder 203 of FIG. 3 and the digital signal produced by the expander circuit 2031 is directly supplied to the added D/A encoder 2033A. Thus, the image signal supplied without intervention of the digital OSD circuit 2032 is not used to display information such as the setting picture and accordingly the image signal can be used for recording.

Further, in FIG. 12, terminals for inputting image signals of two kinds produced by the IRD 200 are provided in the VTR 100. The image input terminal 10V connected to the input change-over switch 13 is supplied with the image signal for record and a newly provided image input terminal 50 is supplied with the image signal for displaying information such as the setting picture.

In this case, by connecting the contact of the image output change-over switch 40V to the D-side, information such as the setting picture displayed by the IRD 200 can be displayed even during recording of digital broadcast in addition to during recording of analog broadcast.

Figure 14:
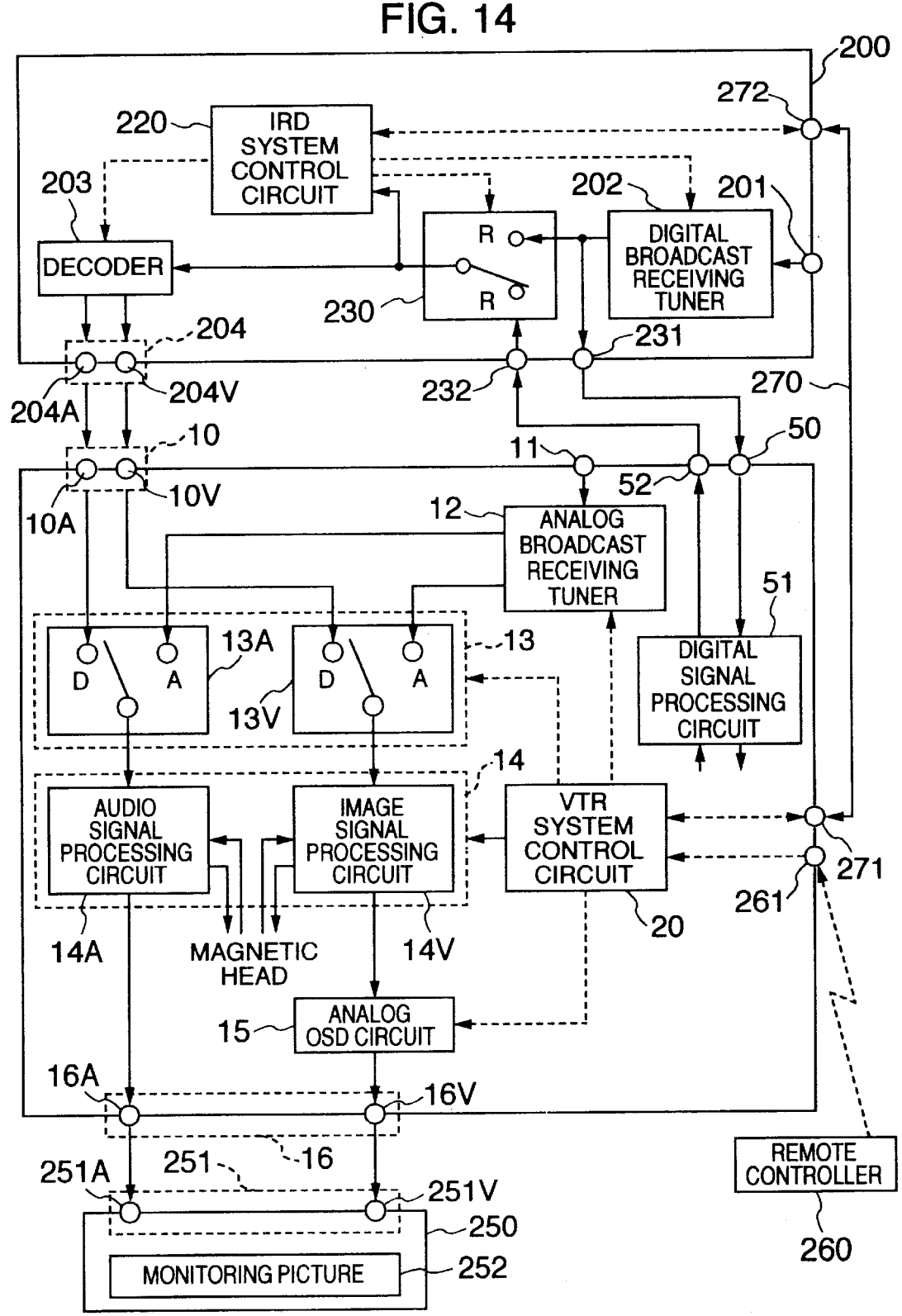
FIG. 14 is a block diagram schematically illustrating a fifth embodiment of an image recording and reproducing apparatus according to the present invention.

FIG. 14 is a block diagram schematically illustrating a fifth embodiment of an image recording and reproducing apparatus according to the present invention.

In the fifth embodiment, the VTR 100 controls the recording and reproducing apparatus to select one of analog image and audio signals and a digital information signal to be recorded and reproduced.

When the digital information signal is recorded, the VTR system control circuit 20 connects the contacts of the input change-over switches 13 to the D-sides and connects a contact of a digital signal input change-over switch 230 to an R-side.

The digital information signal received by the digital broadcast receiving tuner 202 is produced from a digital signal output terminal 231 and is supplied from the digital input terminal 50 to the VTR 100, in which the digital information signal is subjected to record processing in a digital signal processing circuit 51 and is recorded on the magnetic tape by the magnetic head. At the same time, the digital information signal is converted into analog image and audio signals by the decoder 203 to be produced from the output terminals 204. The image and audio signals for digital broadcast are inputted from the input terminals 10 to the VTR 100, in which the signals are supplied through the input change-over switches 13, the signal processing circuits 14 and the analog OSD circuit 15 (only image signal) from the output terminals 16 to the TV 250. Thus, image and voice for the digitally recorded program can be viewed and heard by the TV 250.

At this time, since the digital information signal produced by the IRD 200 from the digital output terminal 231 is a signal to which the information signal is not added by the digital OSD circuit 2032, the digital information signal which is recorded digitally is not influenced at all even if information is displayed by the digital OSD circuit 2032. Accordingly, even when the image output switch is not provided as in the third and fourth embodiments, information can be displayed by the IRD 200 during digital record.

Further, when the digital information signal is reproduced, the VTR system control circuit 20 connects the contacts of the input change-over switches 13 to the D-sides and connects the contact of the digital signal input change-over switch 230 to the P-side.

The digital information signal reproduced by the magnetic head is reproduced by the digital signal processing circuit 51 and outputted from a digital output terminal 52. Further, the digital information signal outputted from the digital output terminal 52 is inputted to the IRD 200 from a digital input terminal 232 and is outputted through the digital signal input change-over switch 230 and the decoder 203 from the output terminals 204 as the analog image and audio signals. These signals are inputted to the VTR 100 again and supplied to the TV 250 through the same path as in the digital recording to thereby be able to view and hear image and voice being played back digitally.

Further, operation at the time that an analog signal is recorded or reproduced is the same as that of the apparatus of FIG. 1.

Figure 15:
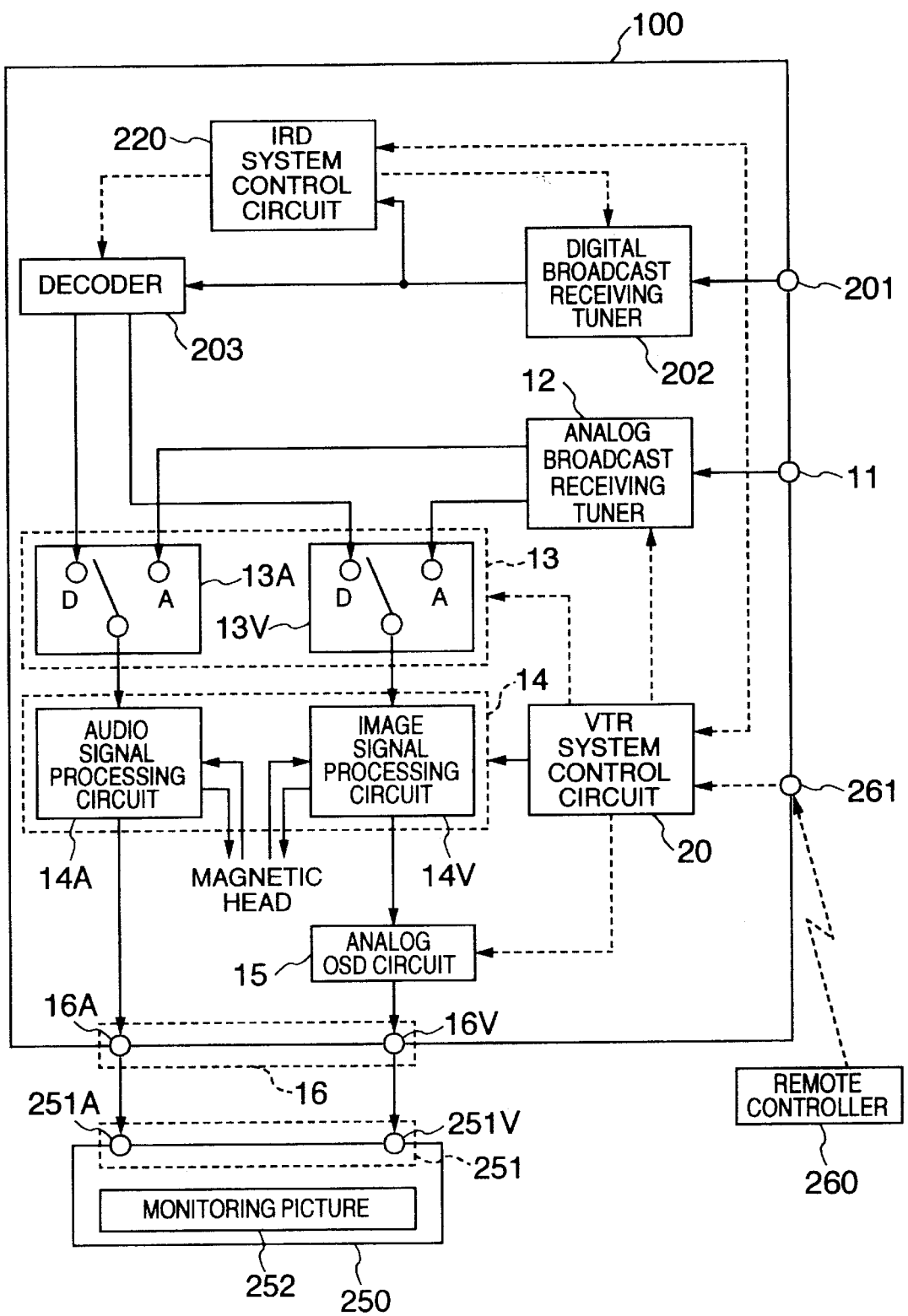
FIG. 15 is a block diagram schematically illustrating a sixth embodiment of an image recording and reproducing apparatus according to the present invention.

FIG. 15 is a block diagram schematically illustrating a sixth embodiment of an image recording and reproducing apparatus according to the present invention.

In the sixth embodiment, the VTR 100 and the IRD 200 are not separated and are integrally combined to form an integral recording and reproducing apparatus. In this case, input and output terminals for signals transmitted between the VTR 100 and the IRD 200 are unnecessary.

In addition, since the IRD 200 previously understands kinds of setting items, names of the items, subitems selected for each item, and names of the subitems preserved in the VTR 100, the IRD 200 can prepare the setting picture for VTR by obtaining only a current state for the setting items.

Further, in the embodiments shown in FIGS. 1, 10, 11, 12, 14 and 15, the remote controller is used to operate the VTR 100 and the IRD 200, while operation buttons disposed in main bodies of the VTR 100 and the IRD 200 can be used to operate the VTR 100 and the IRD 200. Furthermore, measures for producing the states of the VTR 100 and the IRD 200 as information employ a picture using the OSD circuit, while it is considered that the measures can use information by voice.

Figure 16:
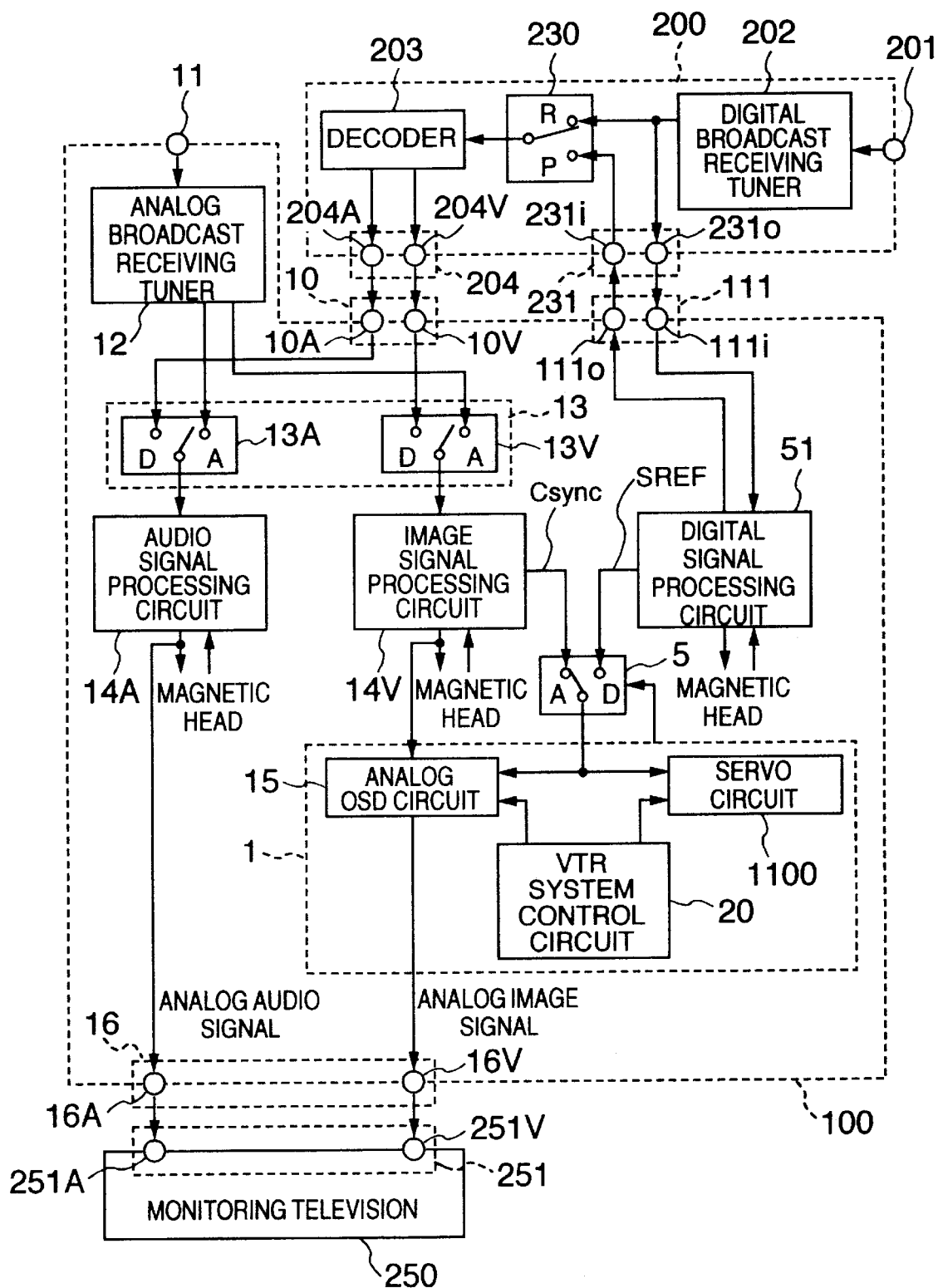
FIG. 16 is a block diagram schematically illustrating a seventh embodiment of an image recording and reproducing apparatus according to the present invention.

FIG. 16 is a circuit diagram schematically illustrating a seventh embodiment of an image recording and reproducing apparatus according to the present invention. In FIG. 16, numeral 100 denotes a VTR, 200 an intelligent receiver and decoder (IRD) and 250 a TV.

First, internal constituent elements of the VTR 100 are described.

Numeral 1 denotes a one-chip microcomputer dedicated to the VTR and which includes a VTR system control circuit 20 composed of a central arithmetic unit for performing arithmetic processing and a memory in which an operation algorithm and internal information are stored and in addition to the VTR system control circuit 20, circuits necessary for control of the VTR such as a servo circuit 1100 for controlling rotation of a drum and a capstan, and an analog OSD circuit 15 for superimposing information onto an analog image signal. Further, numeral 2V denotes an analog image signal processing circuit for processing an analog image signal, 2A an analog audio signal processing circuit for processing an analog audio signal, 2D a digital signal processing circuit for processing a digital signal, 12 an analog broadcast receiving tuner for receiving analog broadcast, 13 input change-over switches for changing over input sources of analog image and audio signals, 5 a reference signal change-over switch for changing over a signal inputted to the one-chip microcomputer 1, 110 input terminals for inputting analog image and audio signals supplied from the IRD 200, 111 digital signal input/output terminals for inputting and outputting a digital signal to the IRD 200, and 16 output terminals for outputting analog image and audio signals to the TV 250. In addition, although not shown in FIG. 16, there is provided the mechanism such as the magnetic tape constituting a medium for recording signals, the magnetic head for writing signals to the magnetic tape, the rotary drum to which the magnetic head is mounted and the capstan for moving the magnetic tape.

A servo reference signal SREF produced by the digital signal processing circuit 2D is a signal indicative to a timing for digital data recorded on one track and is used by the servo circuit 1100 as a reference phase for a rotation phase of the drum and the capstan upon digital recording and reproduction. A complex synchronization signal $C_{sync}$ extracted from an analog image signal by the analog signal processing circuit 2V is a signal indicative of a timing for analog image signal recorded in one track similarly and is used by the servo circuit 1100 as a reference phase for a rotation phase of the drum and the capstan upon analog recording and by the analog OSD circuit 15 as a timing signal for superimposition of information onto an analog image. One of the serve reference signal SREF and the complex synchronization signal $C_{sync}$ is inputted to the one-chip microcomputer 1 by controlling the reference signal change-over switch 5 in accordance with an operation mode of the VTR by means of the VTR system control circuit 20.

Next, internal constituent elements of the IRD 200 and the TV 250 are described.

Numeral 202 denotes a digital broadcast receiving tuner for receiving digital broadcast, 203 a decoder for converting a digital signal into analog image and audio signals, 230 a change-over switch for selecting a signal supplied to the decoder, 204 output terminals for outputting the analog image and audio signals, 231 digital signal input/output terminals for inputting and outputting the digital signal to the VTR 100, and 251 input terminals for inputting the analog image and audio signals.

Further, the VTR 100 and the IRD 200 are connected to each other through a communication line so that the VTR 100 and the IRD 200 can control states of the opposite apparatus. For example, the VTR system control circuit 20 of the VTR 100 is adapted to be able to change over a contact of the change-over switch 230 of the IRD 200.

Operation of the image recording and reproducing apparatus upon analog and digital recording and reproduction is now described in brief.

First, operation in case where a digital broadcast signal is recorded is described.

When the digital broadcast signal is recorded, the VTR system control circuit 20 sets the digital signal processing circuit 2D, the analog image signal processing circuit 2V and the analog audio signal processing circuit 2A to the recording mode and sets the servo circuit 110 to the digital recording mode. Further, the VTR system control circuit 20 connects a contact of the reference signal change-over switch 5 to the D-side, contacts of the input change-over switches 13 to the D-side, and the contact of the change-over switch 230 to the R-side.

The digital broadcast signal inputted to the digital broadcast signal input terminal 201 is demodulated to the digital signal by the digital broadcast receiving tuner 202 is supplied to a digital signal output terminal 2310 and the R-side contact of the change-over switch 230. The digital signal outputted from the digital signal output terminal 2310 is supplied through a digital signal input terminal 111I to the digital signal processing circuit 2D, in which the digital signal is subjected to transmission path coding processing such as addition of an error correction code and modulation and is supplied to the magnetic head. Further, the digital signal processing circuit 2D supplies a servo reference signal SREF which is a timing signal for recording the digital signal to the servo circuit 1100. The servo circuit 1100 controls rotation phases of the rotary drum and the capstan to be coincident with a phase of the reference signal SREF, so that the digital signal is recorded on the magnetic tape while describing a predetermined recording track on the magnetic tape.

Further, the output of the digital broadcast receiving tuner 202 is inputted through the change-over switch 230 to the decoder 203 to be converted into analog image and audio signals. The analog image signal is supplied through the output terminal 204V, the input terminal 110V, the input change-over switch 13V, the analog image signal processing circuit 2V, the analog OSD circuit 15 and the output terminal 16V to the input terminal 251V of the TV 250 and the analog audio signal is supplied through the output terminal 204A, the input terminal 110A, the input change-over switch 13A, the analog image signal processing circuit 2A and the output terminal 116A to the input terminal 251A of the TV 250 to thereby be able to view and hear the digital broadcast program being recorded.

Operation in case where an analog broadcast signal is recorded is now described.

When the analog broadcast signal is recorded, the VTR system control circuit 20 sets the analog image signal processing circuit 2V and the analog audio signal processing circuit 2A to the recording mode and sets the servo circuit 110 to the analog recording mode. Further, the VTR system control circuit 20 connects the contact of the input change-over switch 13 to the A-side and the contact of the reference signal change-over switch 5 to the A-side.

The analog image and audio signals supplied from the analog broadcast receiving tuner 12 are subjected to record signal processing in the analog image signal processing circuit 2V and the analog audio signal processing circuit 2A and are supplied to the magnetic head. Further, the analog image signal processing circuit 2V supplies the complex synchronization signal $C_{sync}$ which is a timing signal for recording the analog image signal to the servo circuit 1100, which controls to the rotation phases of the rotary drum and the capstan to be coincident with the phase of the complex synchronization signal $C_{sync}$, so that the analog image and audio signals are recorded on the magnetic tape while describing a predetermined recording track on the magnetic tape.

Further, the analog image signal is supplied through the analog OSD circuit 15 and the output terminal 16V to the input terminal 251V of the TV 250 and the analog audio signal is supplied through the output terminal 16A to the input terminal 251A of the TV 250, so that the analog broadcast program being recorded can be viewed and heard.

Furthermore, operation in case where the digital broadcast signal is recorded in the analog manner is the same as operation in case where the analog broadcast signal is recorded except that the contacts of the input change-over switches are connected to the D-sides.

Next, operation of reproducing a digital signal is described.

When the digital signal is reproduced, the VTR system control circuit 20 sets the digital signal processing circuit 2D to the reproduction mode, the analog image signal processing circuit 2V and the analog audio signal processing circuit 2A to the recording mode, and the servo circuit 110 to the digital reproduction mode and connects the contact of the reference signal change-over switch 5 to the D-side, the contact of the input change-over switch 13V to the D-side, and the contact of the change-over switch 230 of the IRD 200 to the P-side.

The digital signal processing circuit 2D supplies the serve reference signal SREF to the servo circuit 1100, which controls the rotation phases of the rotary drum and the capstan to be coincident with the servo reference signal SREF, so that the magnetic head reproduces the recorded digital signal. This signal is subjected to the opposite processing to that of the recording time in the digital signal processing circuit 2D and is supplied through the digital signal output terminal 111o, the digital signal input terminal 231I and the change-over switch 230 to the decoder 203 to be converted into the analog image and audio signals. The analog image signal is supplied through the output terminal 204V, the input terminal 110V, the input change-over switch 13V, the analog image signal processing circuit 2D, the analog OSD circuit 15 and the output terminal 16V to the input terminal 251V of the TV 250, and the analog audio signal is supplied through the output terminal 204A, the input terminal 110A, the input change-over switch 13A, the analog image signal processing circuit 2A and the output terminal 16A to the input terminal 251A of the TV 250, so that decoded image and voice of the digital signal being reproduced can be viewed and heard.

Finally, operation of reproducing an analog signal is described.

When the analog signal is reproduced, the VTR system control circuit 20 sets the analog image signal processing circuit 2V and the analog audio signal processing circuit 2A to the reproduction mode and the servo circuit 110 to the analog reproduction mode.

The servo circuit 1100 controls the rotation phases of the rotary drum and the capstan to be coincident with the internally produced phase reference signal and reproduces the analog image and audio signals recorded by the magnetic head. The analog image and audio signals are subjected to the opposite processing to that of the recording time in the analog image signal processing circuit 2V and the analog audio signal processing circuit 2A, respectively. The analog image signal is supplied through the analog OSD display circuit 15 and the output terminal 16V to the input terminal 251V of the TV 250 and the analog audio signal is supplied through the output terminal 16A to the terminal 251A of the TV 250, so that the analog image and audio signals being reproduced can be viewed and heard.

The recording and reproduction operations has been described roughly. Detailed operation of the reference signal change-over switch 5, the servo circuit 1100 and the analog OSD circuit 15 are now described with reference to FIGS. 17, 18, 19 and 20.

Figure 17:
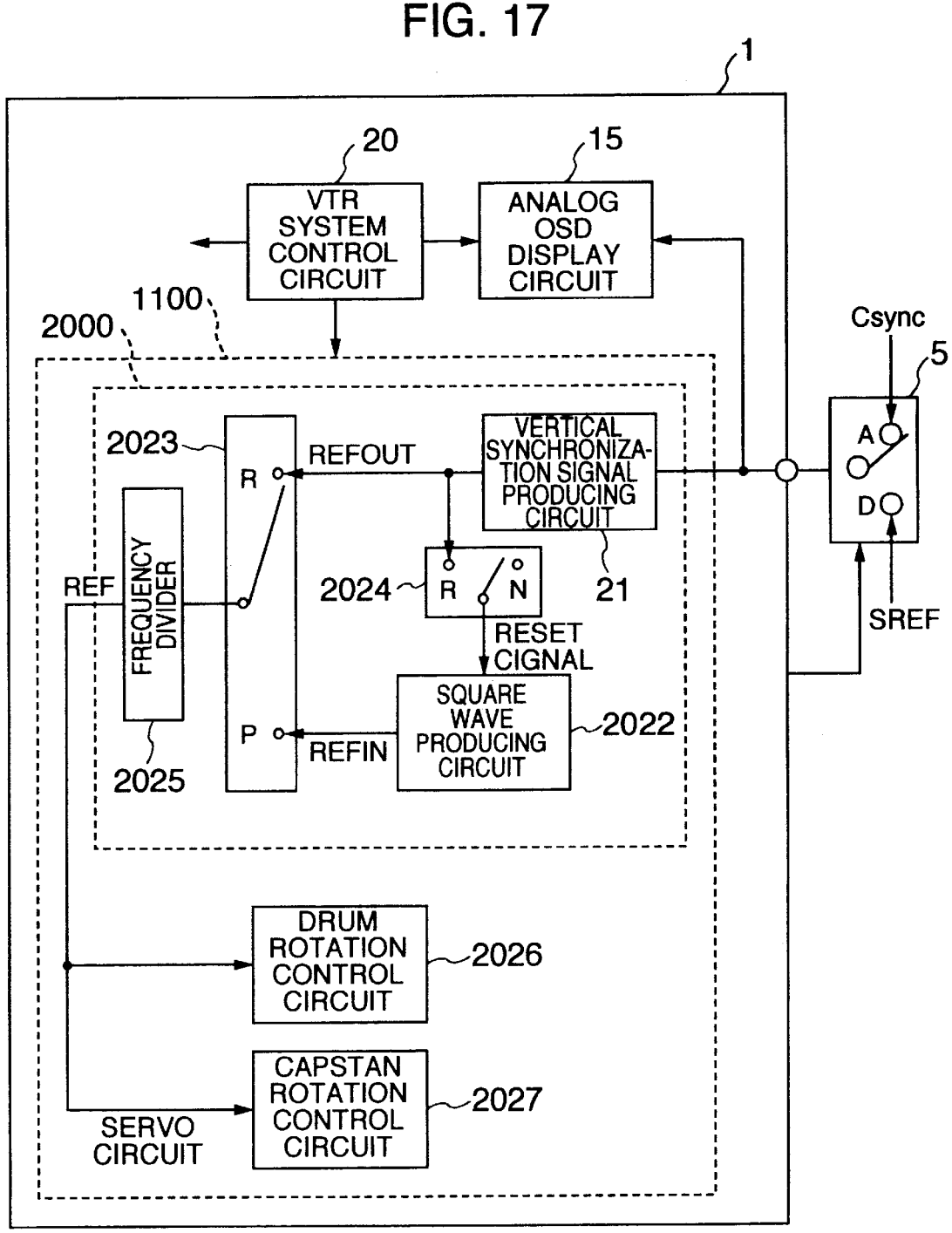
FIG. 17 is a block diagram schematically illustrating a servo circuit used in the present invention and shown in FIG. 16.

FIG. 17 schematically illustrates the one-chip microcomputer 1, a kind-of-tape detection circuit 4 and the reference signal change-over switch 5 extracted from FIG. 16 and further illustrates an internal configuration of the servo circuit 1100. Numeral 2000 denotes a phase reference signal producing circuit for producing a phase reference signal constituting a reference of the rotation phase of the drum and the capstan, 2026 a drum rotation control circuit for controlling rotation of the rotary drum, and 2027 a capstan rotation control circuit for controlling rotation of the capstan. In addition, FIG. 17 illustrates an internal configuration of the phase reference signal producing circuit 2000. Numeral 2021 denotes a vertical synchronization signal producing circuit for extracting a vertical synchronization signal $V_{sync}$ from a decoded synchronization signal $C_{sync}$ to produce a reference signal REFOUT, 2022 a square wave producing circuit for producing a square wave REFIN having a predetermined period by utilizing a clock generated by a quartz-crystal oscillator or the like, 2023 a change-over switch for selecting the signal REFOUT or the signal REFIN, 2024 a reset change-over switch for forcedly resetting an output timing of the square wave producing circuit 2022, and 2025 a frequency divider for frequency-dividing the signal outputted from the change-over switch 2023 into two. Further, control of the change-over switches 2023 and 2024 and setting of a period to the square wave producing circuit are made by the VTR system control circuit 20.

Figure 18:
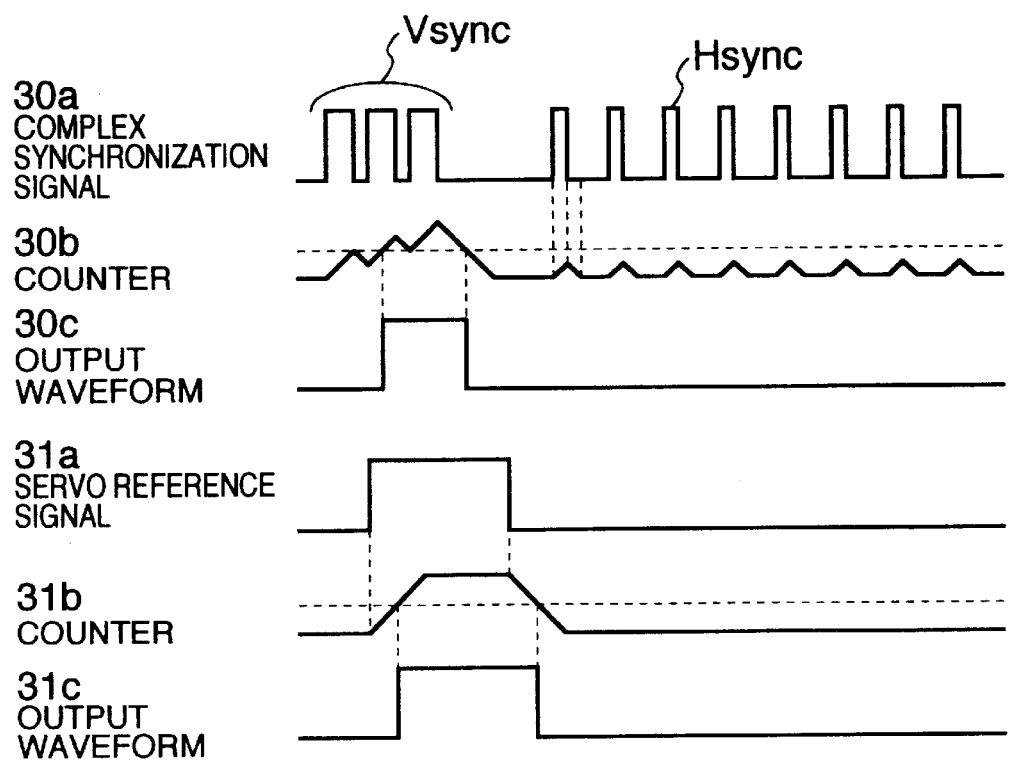
FIG. 18 is a diagram explaining operation of a reference signal generating circuit used in the present invention and shown in FIG. 17.

FIG. 18 is a diagram for explaining operation of the vertical synchronization signal producing circuit 2021.

The vertical synchronization signal producing circuit 2021 includes a counter for performing counting up when an input signal is "H" and performing counting down when the input signal is "L", and an output circuit for producing a signal "H" when a count of the counter exceeds a prescribed value and a signal "L" when the count is smaller than the prescribed value. In FIG. 18, numeral 30a denotes the complex synchronization signal $C_{sync}$ produced by the analog image signal processing circuit 2V, and 31a the synchronization signal SREF produced by the digital signal producing circuit 2D. Waveforms of the counter and waveforms of the output signal at the time that the above two signals are supplied to the vertical synchronization signal producing circuit 2021 are represented by 31a, 31a, 30c and 31c.

The first portion of the signal 30a, that is, the complex synchronization signal $H_{sync}$ corresponds to the vertical synchronization signal $V_{sync}$ and the latter half pulses correspond to a horizontal synchronization signal $H_{sync}$. Each picture of the image signal is synchronized with the vertical synchronization signal $V_{sync}$ and the vertical synchronization signal $V_{sync}$ is used for the reference of the rotation phase of the drum and the capstan upon analog recording. Since the period that the signal is "H" is longer than other portions in the vicinity of the vertical synchronization signal $V_{sync}$, the output waveform 30c substantially conforms in phase to the vertical synchronization signal $V_{sync}$.

Further, the signal 31a, that is, the portion where the synchronization signal SREF is "H" indicates an output timing of digital data for each track produced by the digital signal processing circuit 2D and the synchronization signal SREF is used for the reference of the rotation phase of the drum and the capstan in the digital recording and reproduction operation. Since the time that the synchronization signal SREF is "H" is sufficiently long, the output waveform 31C substantially conforms in phase to the synchronization signal SREF.

Figure 19:
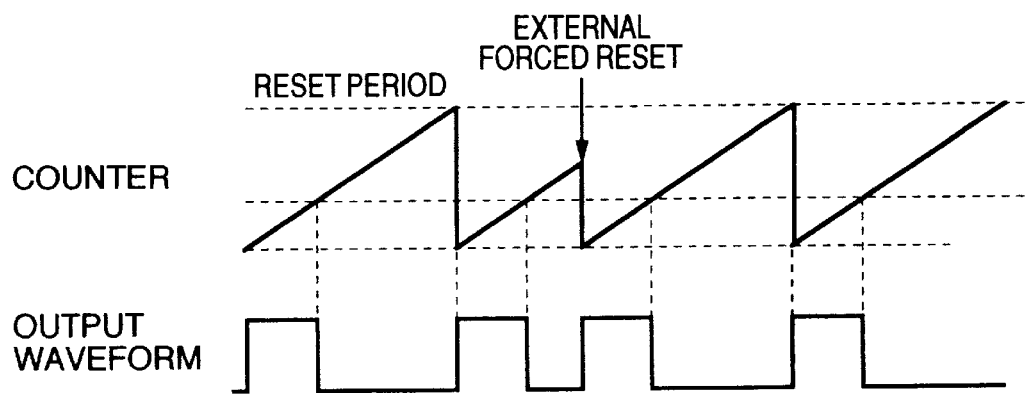
FIG. 19 is a diagram explaining operation of a square wave producing circuit used in the present invention and shown in FIG. 17.

FIG. 19 is a diagram explaining operation of the square wave producing circuit 2022 shown in FIG. 17.

The square wave producing circuit 2022 includes a counter reset at a predetermined period and an output circuit for producing a signal of "H" when a count of the counter is zero and a signal of "L" when the count is a predetermined set value. Further, the counter can be reset externally. The reset period of the counter and the value in case where the output circuit produces the output "L" can be changed by the VTR system control circuit 20.

The square wave producing circuit 2022 continuously produces the square wave of a predetermined period set by the VTR system control circuit 20 when the square wave producing circuit 2022 is not reset externally, while when a reset pulse is applied thereto externally, the count is forcedly reset and accordingly a signal synchronized with the external reset pulse is produced.

Operation of such a configuration is now described by putting emphasis on the signal produced by the phase reference signal producing circuit 2000.

First, analog recording and reproducing operations are described. In these operations, the contact of the reset change-over switch 2024 is connected to the N-side.

In the analog recording operation, since the rotation phase of the drum is required to conform to an image timing for each field of the image signal to be recorded, the contact of the reference signal change-over switch 5 is connected to the A-side and the contact of the change-over switch 2023 is connected to the R-side, so that the two-divided signal of the vertical synchronization signal $V_{sync}$ is produced as the phase reference signal. Further, in the analog reproduction operation, since it is necessary that the rotation phase of the drum conform to the signal having the same period as the reference signal used in the recording operation, the contact of the change-over switch 2023 is connected to the P-side and the same period as the vertical synchronization signal $V_{sync}$, that is, "1/59.94" seconds is set to the square wave producing circuit 2022 to produce the signal having the same frequency as the reference signal in the recording operation as the phase reference signal.

In the analog recording and reproducing operations, since the contact of the reference signal change-over switch 5 is connected to the A-side, the complex synchronization signal $C_{sync}$ is also inputted to the analog OSD circuit 15 and information can be superimposed on the analog image signal.

Next, digital recording and reproducing operations are described.

In the digital recording and reproducing operations, since it is necessary to cause the rotation phase of the drum conforms to the reference signal SREF produced by the digital signal processing circuit 2D, the contact of the reference signal change-over switch 5 is connected to the D-side and the contact of the change-over switch 2023 is connected to the R-side to thereby produce the two-divided signal of the reference signal SREF as the phase reference signal. Further, the contact of the change-over switch 2023 is connected to the R-side and the phase of the signal REFIN produced by the square wave producing circuit 2022 is caused to conform to the phase of the servo reference signal SREF. In addition, the reset period of the square wave producing circuit 2022 is set to the same period as the reference signal SREF produced by the digital signal processing circuit 2D, that is, "1/60" seconds.

When information is superimposed on the analog image signal during the digital recording and reproducing operations, the VTR system control circuit 20 sends necessary information to the analog OSD circuit 15 to control display and connects the contact of the reference signal change-over switch 5 to the A-side, the contact of the change-over switch 2023 to the P-side, and the contact of the reset change-over switch 2024 to the N-side.

Since the contact of the reference change-over switch 5 is connected to the A-side, the complex synchronization signal $C_{sync}$ is supplied to the analog OSD circuit 15 and information can be superimposed on the analog image signal. Further, since the contact of the change-over switch 2023 is connected to the P-side and the contacts of the reset change-over switch 2024 is connected to the N-side, the phase reference signal producing circuit 2000 produces a square wave having the same period as that set in the square wave producing circuit 2022, that is, a signal having the same period as the reference signal SREF. Further, since the square wave producing circuit 2022 is reset by the reference signal SREF when information is not superimposed, the signal produced by the phase reference signal producing circuit 2000 is a signal conforming in phase to the reference signal SREF and the rotation phase of the drum and the capstan is continuously controlled to the same phase as that before the information is superimposed.

When the superimposition of the information is completed, the VTR system control circuit 20 returns the contacts of the reference signal change-over switch 5, the change-over switch 2023 and the reset change-over switch 2024 to the states set before superimposition of the information. Even at this time, since the phases of the signal REFIN produced by the square wave producing circuit 2022 during the superimposition of the information and the reference signal SREF are coincident with each other, the rotation phase of the drum and the capstan are continuously controlled to the same phase as that at the time that the information is superimposed.

FIG. 20 shows a table in which the above states are summarized. The connection sides of the change-over switches 5, 2023 and 2025 and the signals produced by the phase reference signal producing circuit 2000 are shown for the states of the VTR shown on the left side.

As described above, even when the information is superimposed on the analog image signal during the digital recording and reproduction operations, the signal conforming in phase to the servo reference signal SREF is used as the phase reference signal and accordingly the rotation phases of the drum and the capstan are fixed before and after the superimposition of the information.

Further, it is considered that the servo circuit 1100 is caused to perform the same control as in the digital recording and reproduction operations even during waiting, while operations of the reference signal change-over switch 5 and the one-chip microcomputer 1 at the time that the information is superimposed on the analog image signal in this case are quite the same as the operation in the digital recording and reproduction operations.

In addition, when the accuracy of the period of the output waveform produced by the square wave producing circuit 2022 is not sufficient, it is considered that the phase of the signal REFIN produced by the square wave producing circuit 2022 is gradually deviated from the servo reference signal SREF. It is not permissible that the phase of the phase reference signal REF is fluctuated during the digital recording and reproduction operations and accordingly when the accuracy of the square wave producing circuit 2022 is not sufficient, the contact of the reference signal change-over switch 5 is fixed to the D-side not to superimpose information during the digital recording and reproduction operations and the change-over switches are controlled as shown in FIG. 20 only during waiting.

Further, it is judged whether the recorded signal is a digital signal or an analog signal during the reproduction operation so that operation of the VTR 100 is changed to the digital reproduction or the analog reproduction, while when the servo circuit 1100 is set to the digital reproduction mode during the judgment in order to quicken detection of a heading for digital reproduction, the contact of the reference signal change-over switch 5 is fixed to the D-side not to superimpose information at the beginning of the reproduction.

Figure 21:
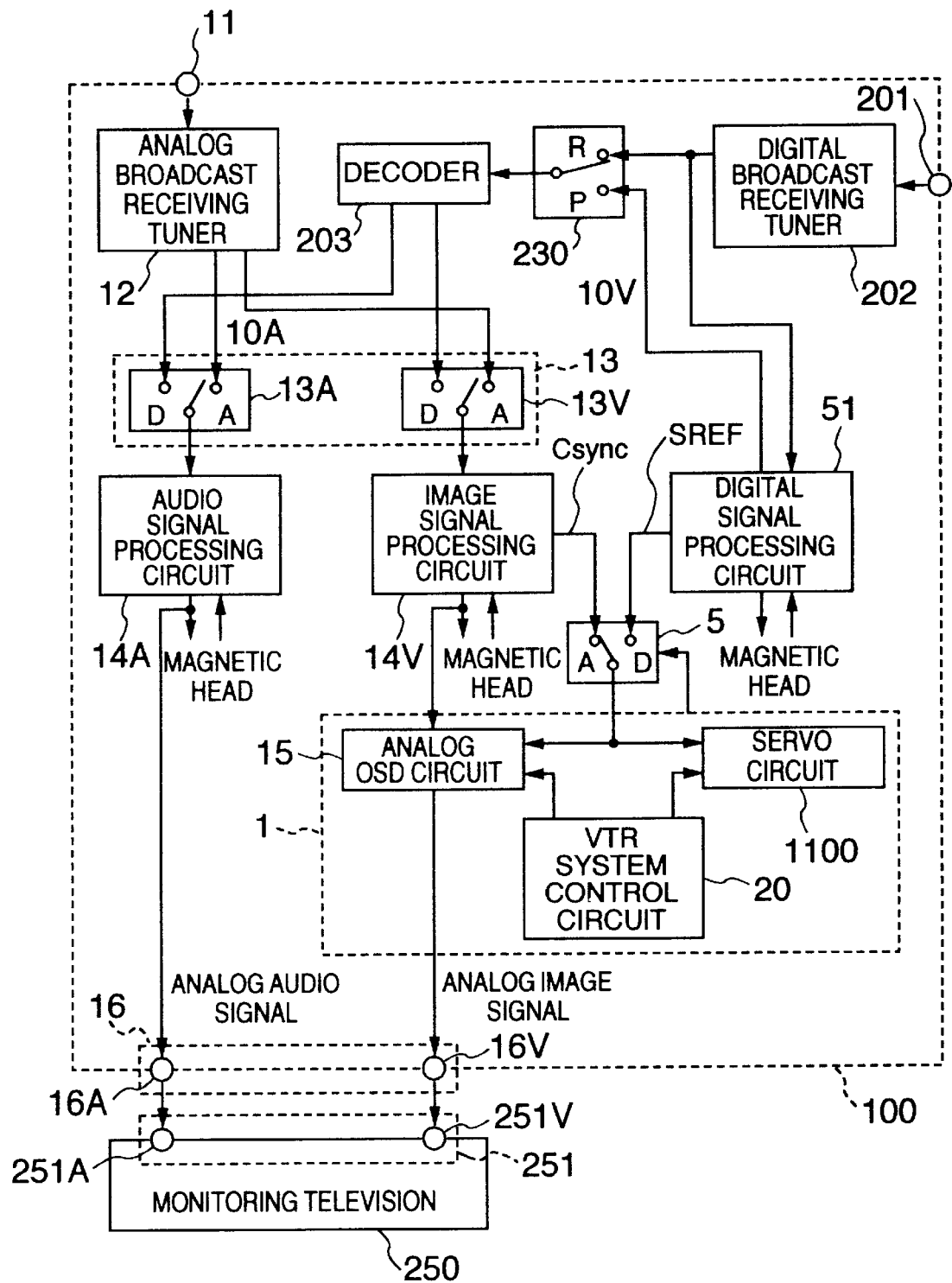
FIG. 21 is a block diagram schematically illustrating an eighth embodiment of an image recording and reproducing apparatus according to the present invention.

FIG. 21 is a block diagram schematically illustrating an eighth embodiment of an image recording and reproducing apparatus according to the present invention.

In the embodiment, the VTR 100 and the IRD 200 shown in FIG. 16 or FIG. 21 are not separated and are integrally combined to form an integral recording and reproducing apparatus. In this case, input and output terminals for signals transmitted between the VTR 100 and the IRD 200 are unnecessary.

Figure 22:
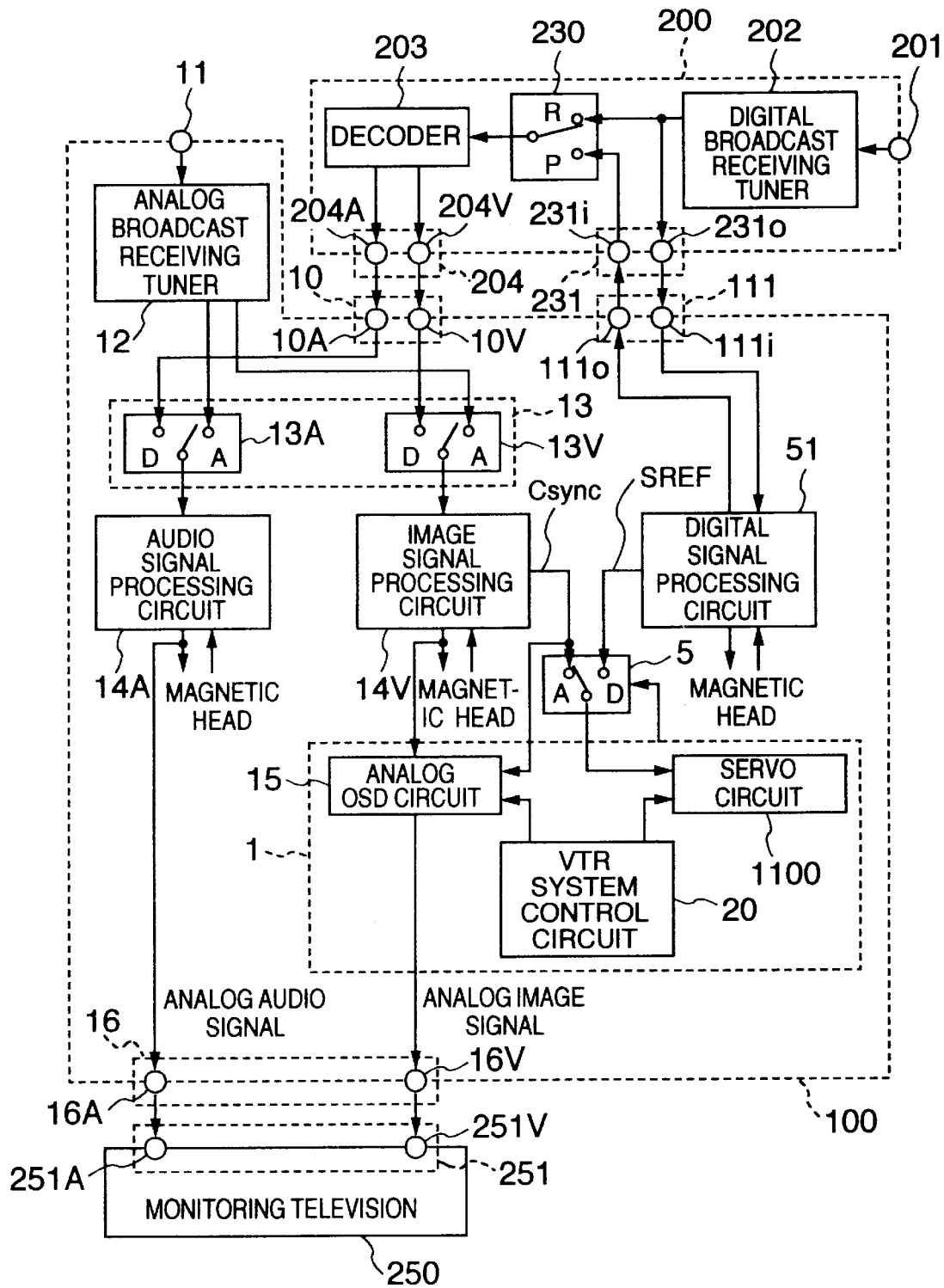
FIG. 22 is a block diagram schematically illustrating a ninth embodiment of an image recording and reproducing apparatus according to the present invention.

FIG. 22 is a block diagram schematically illustrating a ninth embodiment of an image recording and reproducing apparatus according to the present invention.

In the embodiment, reference signal input terminals to the servo circuit 1100 and the analog OSD circuit 15 are provided independently. With such a configuration, since the analog OSD circuit 15 is always supplied with the complex synchronization signal $C_{sync}$ from the analog image signal processing circuit 2V, it is not necessary to change the connection of the reference signal change-over switch 5, the change-over switch 2023 and the reset change switch 2024 even when information is superimposed on the image signal during the digital recording and reproduction operations.

Figure 23:
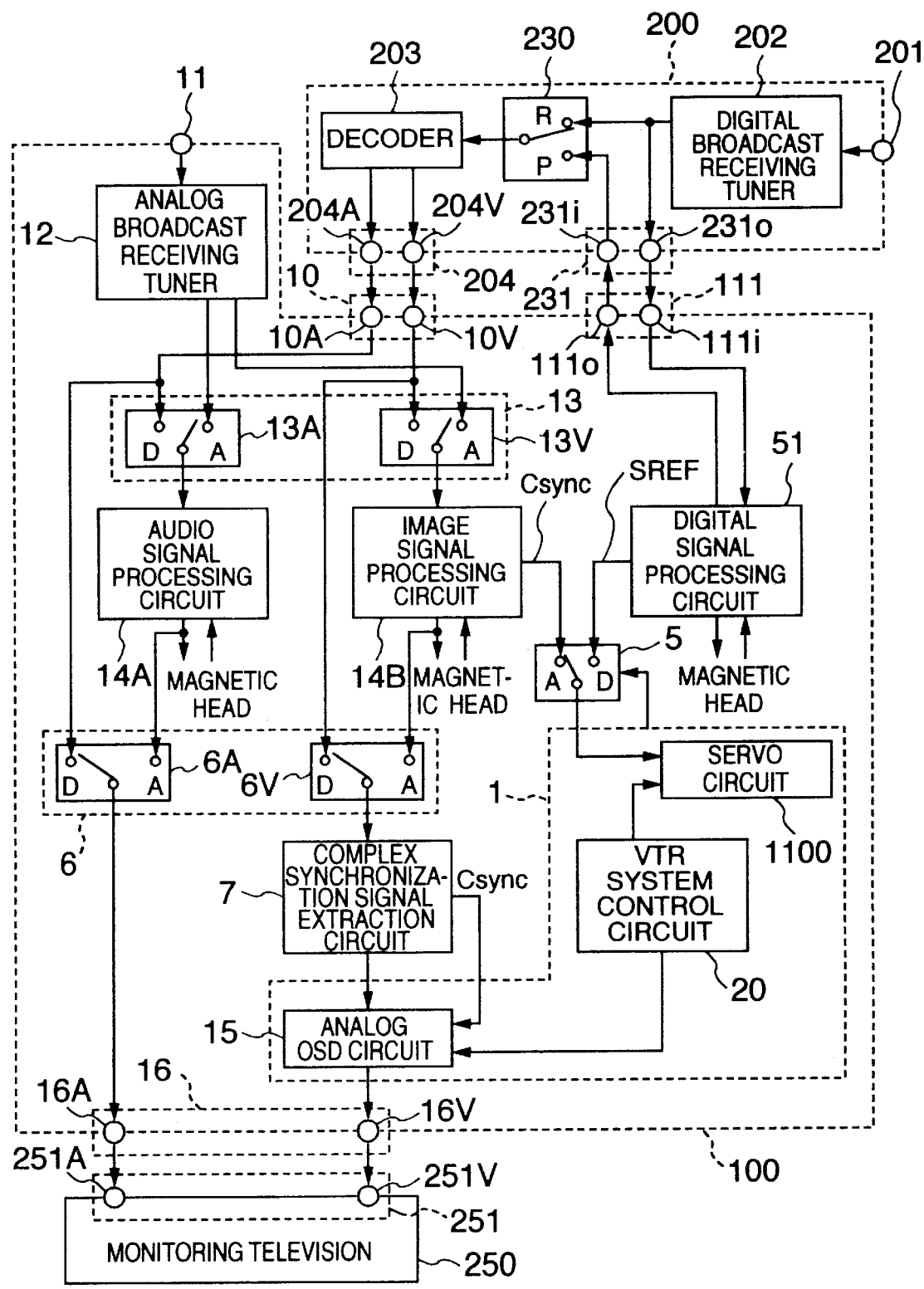
FIG. 23 is a block diagram schematically illustrating a tenth embodiment of an image recording and reproducing apparatus according to the present invention.

FIG. 23 is a block diagram schematically illustrating a tenth embodiment of an image recording and reproducing apparatus according to the present invention.

In the embodiment, output change-over switches 6 for changing over analog image and audio signals produced by the VTR 100 are added to the embodiment of FIG. 22. The contacts of the input change-over switches 13 are connected to the A-sides and the contacts of the output change-over switches 6 are connected to the D-sides to thereby be able to view and hear the digital broadcast program supplied from the IRD 200 while recording an analog broadcast program.

In such a configuration, when information is superimposed on an analog image, it is necessary to superimpose information on the analog image signal produced from the VTR 100 instead of the recorded analog image and accordingly a complex synchronization signal extraction circuit 7 for supplying the complex synchronization signal $C_{sync}$ to the analog OSD circuit 15 and the analog OSD circuit 15 for superimposing information is provided additionally after the output change-over switch 6V.

The embodiments of the present invention have been described.

Further, in FIGS. 16, 21, 22 and 23, description has been made to the example where the system control circuit, the servo circuit and the analog OSD circuit are included in one chip, while the configuration of these circuits are not limited thereto and these circuits may be configured independently. In addition, in the foregoing description, the period set to the square wave output circuit in the digital recording and reproduction operations is set to a fixed period, while the period may be set to a period of the reference signal SREF actually measured by the system control circuit, for example.

As described above, according to the present invention, the VTR and the IRD communicate with each other so that the VTR and the IRD can set and obtain the operation states and the set contents of the other apparatus and the IRD notifies information of the VTR to the user by using the picture of the same form as the picture in which the state of the IRD is notified to the user and causes the user to set the state of the VTR by using the picture of the same form as the picture in which the IRD causes the user to set the state of the IRD.

Further, similarly, the VTR notifies information of the IRD to the user by using the picture of the same form as the picture in which the state of the VTR is notified to the user and causes the user to set the state of the IRD by using the picture of the same form as the picture in which the VTR causes the user to set the state of the VTR. In this manner, operations of the VTR and the IRD are integrated and the user's operation is simplified.

Further, according to the present invention, since the reference signal of the analog image signal is always supplied to the analog OSD circuit during superimposition of information onto the analog image signal and the signal having the phase coincident with the reference signal SREF of the digital signal is used as the phase reference signal during the digital recording and reproduction operations, information can be superimposed on the analog image signal even during the digital recording and reproduction operations.

What is claimed is:

1. A recording and reproducing apparatus to record and reproduce a signal to and from a recording medium, comprising:
    a receiving circuit to receive a digital broadcasting signal and to convert the digital broadcasting signal into a record-formed signal;
    a recording and reproducing circuit to record and reproduce the record-formed signal supplied from the receiving circuit, to and from the recording medium; and
    a decoding and output circuit to decode the digital broadcasting signal which is received by the receiving circuit or the record-formed signal which is reproduced by the recording and reproducing circuit, and to output the decoded signal to a display unit:
    wherein the decoding and output circuit outputs both the operation states of the receiving circuit and the recording and reproducing circuit to be supplied to the display unit, such that the operation states are displayed with images formed substantially identical in format to one another on the display unit.

2. A recording and reproducing apparatus according to claim 1, further comprising a setting information input circuit to set the operation states of the receiving circuit and the recording and reproducing circuit, wherein the setting information input circuit sets the operation states of the receiving circuit and the recording and reproducing circuit using ones of the images formed substantially identical in format to one another on the display unit.

3. A recording and reproducing apparatus according to claim 1, wherein the digital broadcasting signal is a video signal, and wherein the decoding and output circuit outputs the information associated with the operation states of the receiving circuit and the recording and reproducing circuit by superimposing the information on the received video signal or the reproduced video signal, or by replacing the received video signal or the reproduced video signal with the information.

4. A recording and reproducing apparatus according to claim 1, wherein the digital broadcasting signal is a digitally-compressed video signal, and
    wherein the decoding and output circuit outputs the information associated with the operation states of the receiving circuit and the recording and reproducing circuit by superimposing the information on the video signal which is decoded, or by replacing the video signal which is decoded.

5. A receiving apparatus to receive a transmitted signal and to output/input the received signal to and from a recording and reproducing unit, comprising:
    a receiving circuit to receive a digital broadcasting signal which is transmitted;
    a signal output and input circuit to output and input the digital broadcasting signal to and from the recording and reproducing unit; and
    a decoding and output circuit to decode the digital broadcasting signal which is received by the receiving circuit or by the recording and reproducing circuit, and to output the decoded signal to a display unit:
    wherein the decoding and output circuit acquires the operation state of the recording and reproducing unit, and outputs the operation states of both the receiving circuit and the recording and reproducing unit to the display unit such that the operation states are displayed with images formed substantially identical in format to one another on the display unit.

6. A receiving apparatus according to claim 5 further comprising a setting information input circuit to set the operation states of the receiving circuit and the recording and reproducing unit, wherein the setting information input circuit sets the operation states of the receiving circuit and the recording and reproducing unit using ones of the images formed substantially identical in format to one another on the display unit, and sends the set information to the recording and reproducing unit.

7. A receiving apparatus according to claim 5, wherein the digital broadcasting signal is a video signal, and wherein the decoding and output circuit outputs the information associated with the operation states of the receiving circuit and the recording and reproducing unit by superimposing the information on the received video signal or the reproduced video signal inputted from the recording and reproducing unit, or by replacing the received video signal or the reproduced video signal with the information.

8. A receiving apparatus according to claim 5, wherein the digital broadcasting signal is a digitally-compressed video signal, and wherein the decoding and output circuit outputs the information associated with the operation states of the receiving circuit and the recording and reproducing unit by superimposing the information on the video signal which is decoded, or by replacing the video signal which is decoded.

9. A receiving apparatus to receive a transmitted signal and to input/output the received signal from and to an external unit, comprising:

a receiving circuit to receive a digital broadcasting signal which is transmitted;

a signal input and output circuit to input/output the digital broadcasting signal to/from the external unit; and a decoding and output circuit to decode the digital broadcasting signal which is received by the receiving circuit or by the external unit and to output the decoded signal to a display unit;

wherein the decoding and output circuit acquires the operation state of the external unit, and outputs the operation states of both the receiving circuit and the external unit to the display unit such that the operation states are displayed with images formed substantially identical in format to one another on the display unit.

10. A receiving apparatus according to claim 9, further comprising a setting information input circuit to set the operation states of the receiving circuit and the external unit, wherein the setting information input circuit sets the operation states of the receiving circuit and the external unit using ones of the images formed substantially identical in format to one another on the display unit, and sends the set information to the external unit.

11. A receiving apparatus according to claim 9, wherein the digital broadcasting signal is a video signal, and wherein the decoding and output circuit outputs the information associated with the operation states of the receiving circuit and the external unit by superimposing the information on the received video signal or the video signal outputted from the external unit, or by replacing the received video signal or the video signal outputted from the external unit with the information.

12. A receiving apparatus according to claim 9, wherein the digital broadcasting signal is a digitally-compressed video signal, and wherein the decoding and output circuit outputs the information associated with the operation states of the receiving circuit and the external unit by superimposing the information on the video signal which is decoded, or by replacing the video signal which is decoded.

* * * * *